(12) United States Patent
Zahirovic et al.

(10) Patent No.: US 12,226,763 B2
(45) Date of Patent: Feb. 18, 2025

(54) DENSE LOADING SYSTEM WITH WAVE LOADER

(71) Applicant: Catmasters, LLC, Pasadena, TX (US)

(72) Inventors: Emir Zahirovic, Copenhagen V (DK); Marc Angelo Rogato, Houston, TX (US); Richard Visscher, Katy, TX (US)

(73) Assignee: Catmasters, LLC, Pasadena, TX (US)

( * ) Notice: Subject to any disclaimer, the term of this patent is extended or adjusted under 35 U.S.C. 154(b) by 368 days.

(21) Appl. No.: 18/049,578

(22) Filed: Oct. 25, 2022

(65) Prior Publication Data

US 2023/0145811 A1   May 11, 2023

Related U.S. Application Data

(60) Provisional application No. 63/271,586, filed on Oct. 25, 2021.

(51) Int. Cl.
*B01J 8/00* (2006.01)

(52) U.S. Cl.
CPC .... *B01J 8/0045* (2013.01); *B01J 2208/00805* (2013.01); *B01J 2208/00938* (2013.01)

(58) Field of Classification Search
CPC . B01J 8/0045; B01J 8/003; B01J 8/008; B01J 2208/00805; B01J 2208/00938
See application file for complete search history.

(56) References Cited

U.S. PATENT DOCUMENTS

| | | |
|---|---|---|
| 4,159,785 A | 7/1979 | Berry, Jr. |
| 4,564,328 A | 1/1986 | Loutaty |
| 5,731,994 A | 3/1998 | Okubo et al. |
| 2008/0216918 A1 | 9/2008 | Comardo |
| 2010/0019952 A1 | 1/2010 | Poussin |

(Continued)

FOREIGN PATENT DOCUMENTS

| | | |
|---|---|---|
| AU | 2008350089 A2 | 5/2011 |
| IT | BO20090446 | 1/2011 |
| RU | 2661519 | 7/2018 |

OTHER PUBLICATIONS

Prodcuts and Services, retrieved from the internet, retrieved on Oct. 26, 2022; <URL: https://uop.honeywell.com/en/products-and-services/all-product-and-services>.

(Continued)

*Primary Examiner* — Lessanework Seifu

(57) ABSTRACT

A dense loading system with wave loader is a device intended to maximize and evenly distribute catalyst within a catalyst reactor. More specifically, the device provides a dense loading machine that uses air/nitrogen to propel catalysts within the space of a catalyst reactor. To accomplish this, the system includes a unique arrangement of components that utilizes a hybrid distribution of catalyst through a specifically shaped catalyst distribution disc. Further, the catalyst distribution disc is subjected to both pneumatic and rotational forces with the help of a sparger system and a motor system. In addition, the system provides a dense loading machine that may be operated manually or autonomously. Further, the device may load catalyst in radial waves, may achieve targeted area loading, and includes a gyroscopic auto alignment system for the catalyst distribution disc. Thus, the dense loading system that can efficiently and evenly distribute catalyst within a catalyst reactor.

20 Claims, 22 Drawing Sheets

(56) References Cited

U.S. PATENT DOCUMENTS

| | | |
|---|---|---|
| 2014/0037419 A1 | 2/2014 | Ramos et al. |
| 2014/0275629 A1 | 9/2014 | Chen et al. |
| 2015/0144223 A1 | 5/2015 | Mairesse |
| 2018/0304219 A1 | 10/2018 | Cornett et al. |
| 2020/0215508 A1 | 7/2020 | Girard |
| 2020/0256740 A1 | 8/2020 | Miller |
| 2021/0146326 A1 | 5/2021 | Zahirovic |

OTHER PUBLICATIONS

Our Services, retrieved from the internet, retrieved on Oct. 26, 2022; <URL: https://www.cat-tech.com/cat-tech-services>.

Technology, retrieved from the, internet retrieved on Oct. 26, 2022; <URL:https://www.buchen-ics.co.uk/technology/catalyst-handling-technology/>.

Dense Loading, retrieved from the internet, retrieved on Oct. 26, 2022; <URL: https://www.hpa-group.org/dense-loading-technology-1>.

Densicat, retrieved from the internet, retrieved on Oct. 26, 2022; <URL: https://www.petroval.com/catalyst-department/loading-technologies/densicat>.

Catalyst Services, retrieved from the internet, retrieved on Oct. 26, 2022; <URL: https://www.swatservice.com/service-lines/catalyst-services/>.

Lever Effect: Reactivity Maximized by Method of Catalyst Loading, retrieved from the internet, retrieved on Oct. 26, 2022; <URL: https://www.linkedin.com/pulse/lever-effect-reactivity-maximized-method-catalyst-loading-caldas>.

Wooten J T, "Dense and Sock Catalyst Loading Compared", Oil and Gas Journal, Pennwell, Houston, TX, US, vol. 96, No. 41, Oct. 12, 1998, XP000831285, ISSN: 0030-1388, p. 68.

A

B

C

DENSE LOADING SYSTEM WITH WAVE LOADER

FIELD OF THE INVENTION

The present invention relates to dense loading machines. More specifically, the present invention is an innovative and improved dense loading machine that is able to evenly distribute catalyst within a catalyst reactor.

BACKGROUND OF THE INVENTION

Dense loading is a technology used for improving catalyst performance in catalytic process units. It is commonly used throughout the petroleum, petrochemical and chemical industries and involves distributing the catalyst in such a way as to uniformly increase its packed density. In many existing catalytical reactors, reactor reactants are typically liquids and/or gases, and catalysts itself are typically solids. Catalyst is the material which improves rates or makes chemical reactions possible but is not consumed in those reactions. Catalysts can be of different structure, shape, and sizes. The catalyst can be loaded into a catalyst reactor by sock or dense loading method. Sock loading is typically achieved by distributing the catalyst over the catalyst bed manually with gravity only. Dense loading is typically achieved by using mechanical methods such as using a dense loading machine. Maximization of catalyst within a catalyst reactor is needed to achieve the highest activity rate per unit of volume which results with improving the efficiency of a catalyst reactor. Thus, the goal of a dense loading machine is to maximize catalyst loading per unit of volume in a catalyst reactor. The shape and size of a catalyst can greatly affect how the catalyst is distributed within a dense loading apparatus. In addition, the need for having an even distribution level of catalyst within a catalyst reactor is essential for the dense loading process of a reactor. There are many different dense loading machines and each dense loading machine most likely operate differently than one another.

All conventional and existing dense loading machines have limitations in their operation, and they must be manually re-adjusted during the loading process within a catalyst reactor. The continual need to readjust the settings of the dense loading machine will cause quality issues alongside delaying and taking longer to finish the objective of uniformly distributing the catalyst pallets within a catalyst reactor. As the catalyst is being loaded, the catalyst bed is gradually stacking with catalyst pallets and the bed continues to increase in height within the catalyst reactor. As the catalyst bed reach closer to the dense loading machine, the falling distance of the catalyst pallets are much shorter than when the catalyst bed is further away from the dense loading machine. Thus, the pallets may not reach outer areas of the loaded bed.

An objective of the present invention is to maximize and evenly distribute catalyst within a catalyst reactor. To accomplish this, the present invention provides a dense loading system that uses air/nitrogen to propel catalysts within the space of a catalyst reactor. In addition, the present invention provides a dense loading machine that is able to operate manually or autonomously. The present invention provides a unique dense loading system that is used to evenly distribute catalyst within a catalyst reactor.

SUMMARY OF THE INVENTION

An objective of the present invention is to maximize and evenly distribute catalyst within a catalyst reactor. More specifically, the present invention provides a dense loading machine that uses air/nitrogen to propel catalysts within the space of a catalyst reactor. To accomplish this, the present invention comprises a unique arrangement of components that utilizes a hybrid distribution of catalyst through a specifically shaped catalyst distribution disc. Further, the catalyst distribution disc is subjected to both pneumatic and rotational forces in the present invention. In addition, the present invention provides a dense loading machine that may be operated manually or autonomously. Thus, the present invention provides a unique dense loading system that can efficiently and evenly distribute catalyst within a catalyst reactor.

DETAILED DESCRIPTION OF THE INVENTION

Detailed embodiments of the present invention are disclosed herein. However, it is to be understood that the disclosed embodiments are merely exemplary of the present invention, which may be embodied in various systems. Therefore, specific details disclosed herein are not to be interpreted as limiting, but rather as a basis for teaching one skilled in the art to variously practice the present invention.

All illustrations of the drawings are for the purpose of describing selected versions of the present invention and are not intended to limit the scope of the present invention. In reference to FIG. 1 through FIG. 22, the present invention is a dense loading system. An objective of the present invention is to maximize and evenly distribute catalyst within a catalyst reactor. More specifically, the present invention provides a dense loading machine that uses air/nitrogen to propel catalysts within the space of a catalyst reactor. To accomplish this, the present invention comprises a unique arrangement of components that utilizes a hybrid distribution of catalyst through a specifically shaped catalyst distribution disc. Further, the catalyst distribution disc is subjected to both pneumatic and rotational forces in the present invention. In addition, the present invention provides a dense loading machine that is able to operate manually or autonomously. Thus, the present invention provides a unique dense loading system that can efficiently and evenly distribute catalyst within a catalyst reactor.

Figure 1:
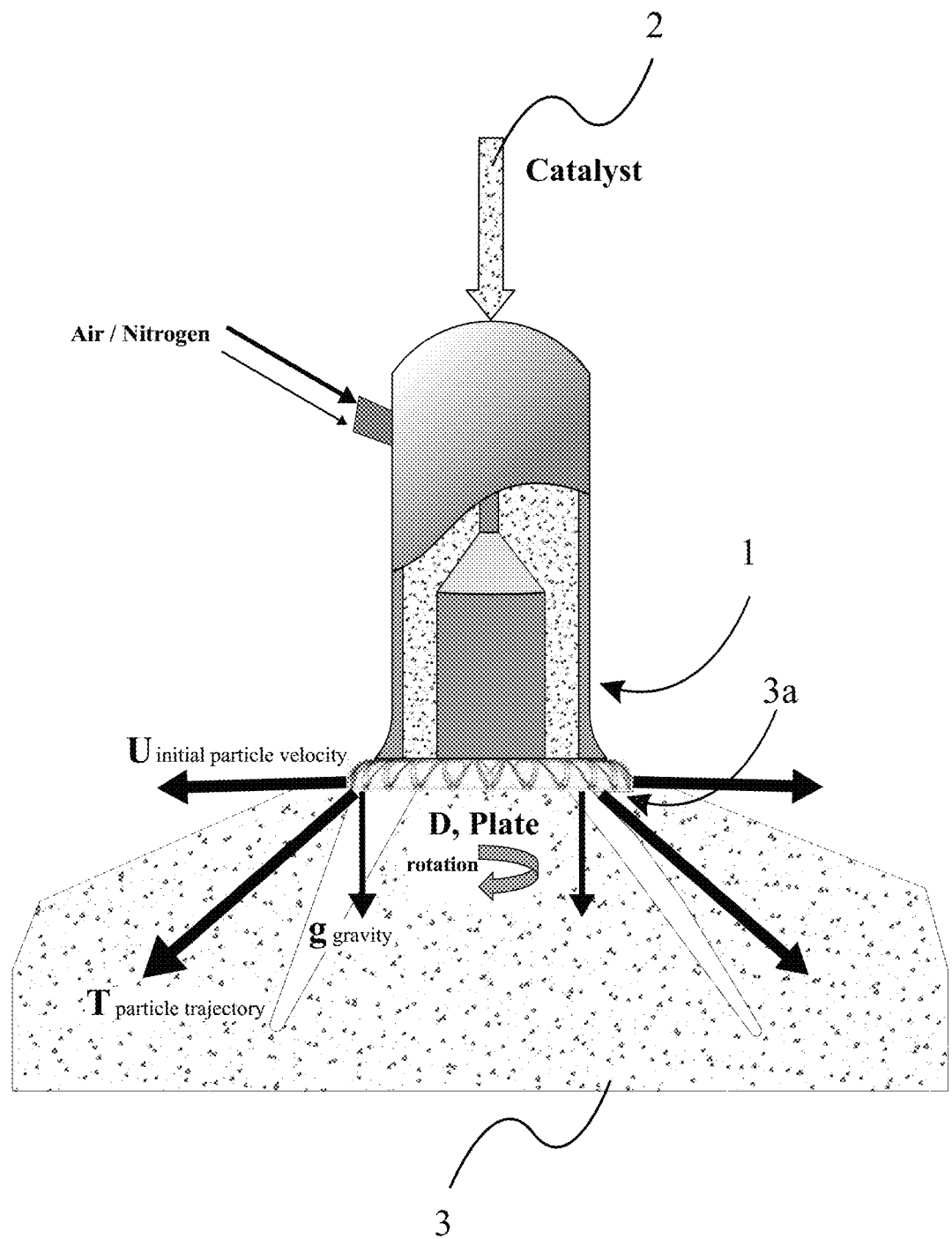
FIG. 1 is an illustration of a dense loading system according to the present invention.

The following description is in reference to FIG. 1 through FIG. 22. According to a preferred embodiment, the present invention comprises a dense loading machine 1, a catalyst load 2, and a catalyst reactor 3. As seen in FIG. 1, the dense loading machine 1 is installed through an opening section above the area in which the catalyst load is to be loaded. In other words, the dense loading machine 1 is mounted within a loading aperture 3a of the catalyst reactor 3. The dense loading machine will deliver and distribute the catalyst load 2 across a cross section of the catalyst reactor 3 by means of spinning and blowing. To accomplish this, the dense loading machine 1 comprises a receptacle 4, a cavity 5, a catalyst receiving port 6, a sparger system 7, a gas piping system 8, a motor system 9, and a catalyst distribution disc 10.

Figure 2:
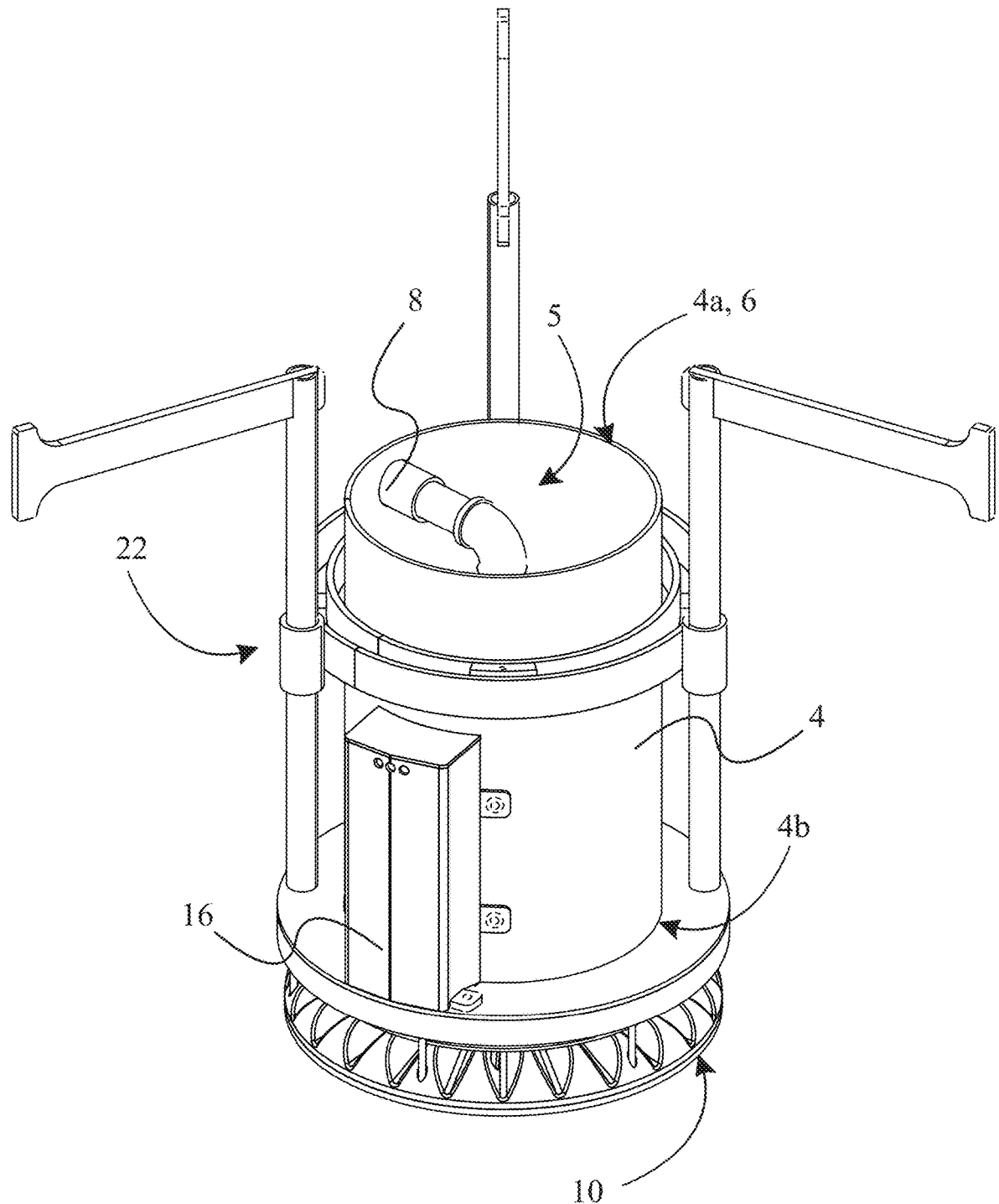
FIG. 2 is a top-front-left perspective view of a dense loading machine according to a preferred embodiment of the present invention.

In reference to FIG. 2, the cavity 5 traverses into the receptacle 4, and the cavity 5 extends from a first end 4a of the receptacle 4 towards a second end 4b of the receptacle 4 wherein the first end 4a is positioned opposite to the second end 4b across the receptacle 4. This is so that, the cavity 5 within the receptacle 4 may house the main components of the present invention and guide the incoming catalyst load 2 into the catalyst reactor 3. To that end, the catalyst receiving port 6 delineates the first end 4a of the receptacle 4. In other words, the catalyst load 2 is received through the catalyst receiving port 6, which may also be the open end or first end 4a of the receptacle 4.

As seen in FIG. 2 through FIG. 7, the catalyst distribution disc 10 is mounted adjacent to the second end 4b of the receptacle 4. More specifically, the catalyst distribution disc 10 is fastened within the internal cavity of a catalyst reactor 3 and is fastened to the base of the dense loading machine 1. Preferably, the catalyst distribution disc 10 is a device used to assist the distribution of catalyst load 2 within the catalyst reactor 3 or of the likes. In the preferred embodiment, the catalyst distribution disc 10 is a circular disc with grooves, ridges, slots etc. However, the catalyst distribution disc 10 may comprise any other size, shape, components, arrangement of components etc. that are known to one of ordinary skill in the art, as long as the intents of the present invention are not altered.

Figure 6:
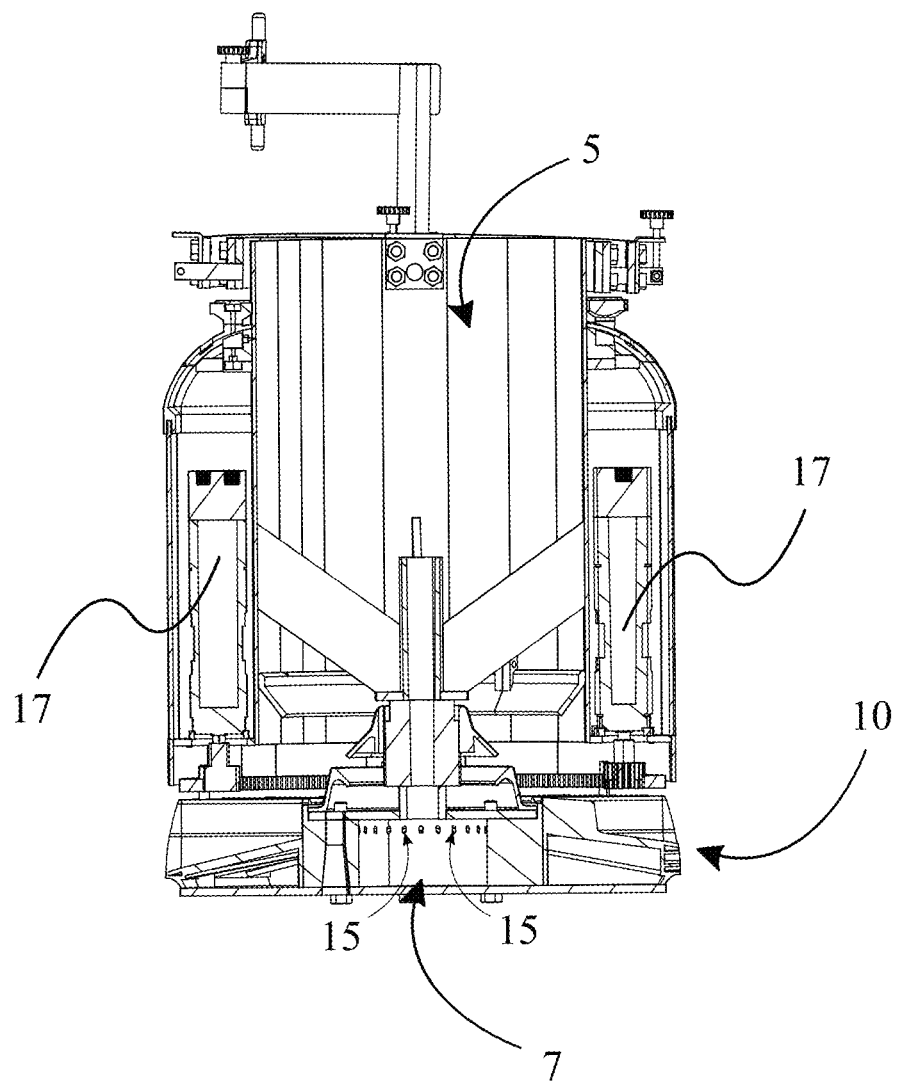
FIG. 6 is a sectional view of the dense loading machine taken along A-A' of FIG. 5.
Figure 7:
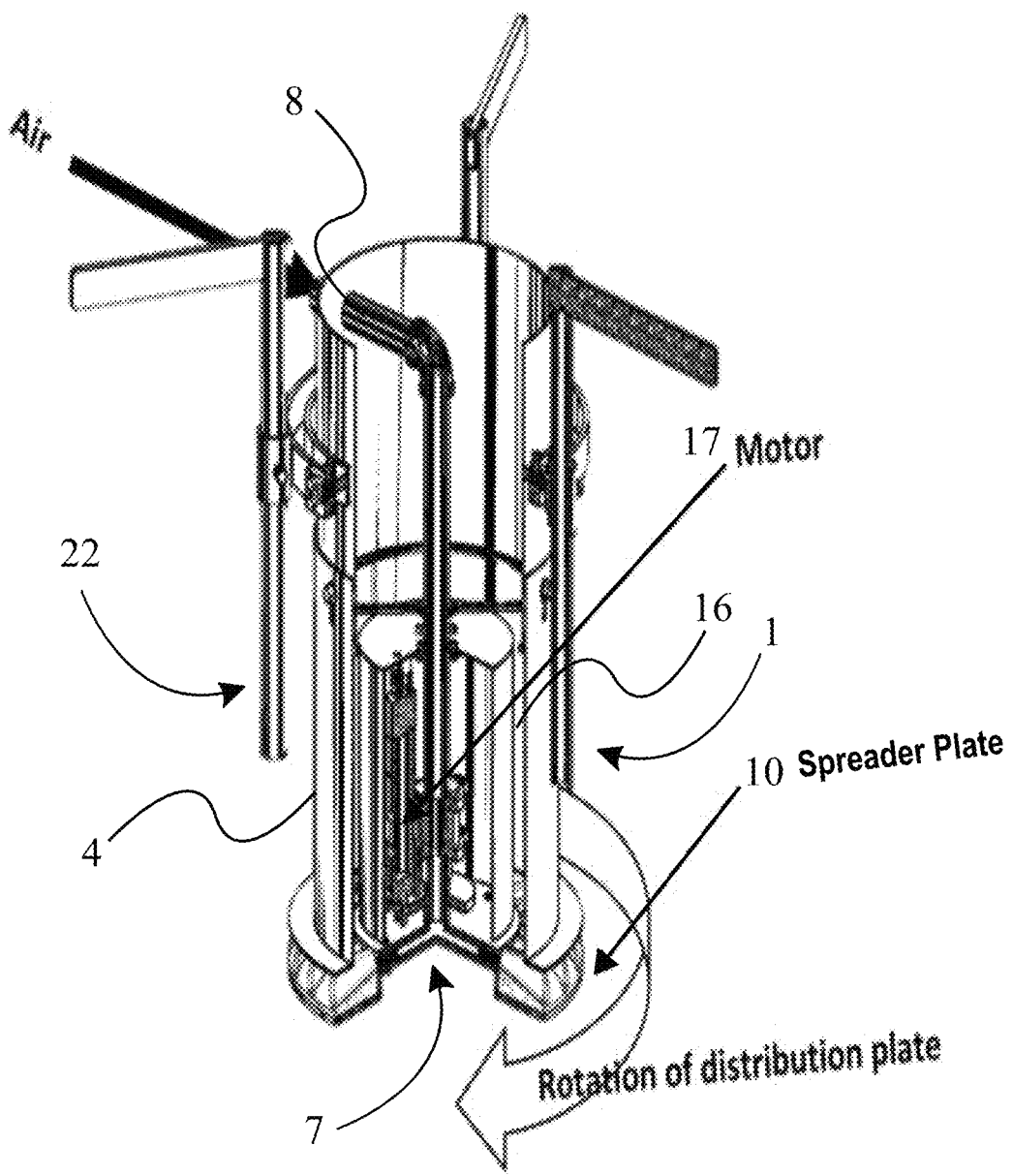
FIG. 7 is perspective view of an alternate embodiment of the present invention, wherein a motor compartment and a motor are positioned within a receptacle.

According to the preferred embodiment, the present invention provides a dense loading machine 1 that uses air/nitrogen to propel catalysts within the space of the catalyst reactor 3. To accomplish this, the sparger system 7 is mounted centrally within the cavity 5 adjacent to the second end 4b of the receptacle 4 and connected to the gas piping system 8. More specifically, the gas piping system 8 is in fluid communication with the sparger system 7 and the motor system 9. This is so that working gas may be delivered to both the sparger system 7 and the motor system 9 through the gas piping system 8. In other words, the working gas is used for the propelling of the catalyst as well as to power the motor that turns the distribution disc 10 of the dense loading machine 1. In the preferred embodiment, air streams are delivered to the dense loading machine 1 through two independent piping systems. As seen in FIG. 6 and FIG. 7, the sparger system 7 is operably aligned to the catalyst distribution disc 10, wherein gas from the gas piping system 8 is distributed along the catalyst distribution disc 10 through the sparger system 7. This is so that the catalyst load 2 delivered to the cavity 5 of the receptacle 4 is directed onto the catalyst distribution disc 10, which in turn will be delivered to the air/nitrogen stream exiting from the sparger system 7. This ensures that no catalyst is resting on the distribution disc 10.

In the preferred embodiment and as seen in FIG. 7, (an illustration showing rotation of catalyst distribution disc), the motor system 9 has a roll to rotate the distribution disc 10. In other words, the catalyst distribution disc 10 is operably coupled with the motor system 9, wherein operating the motor system 9 governs rotational motion of the catalyst distribution disc 10. Preferably, rotation speed of the catalyst distribution disc 10 is low, and the catalyst distribution disc 10 is rotatably coupled around the receptacle 4. Thus, according to the present invention, a hybrid distribution of catalyst, which includes both pneumatic and rotational forces acting on the catalyst distribution disc, is made possible through the arrangement of the dense loading machine 1. Accordingly, the dense loading machine 1 is operably coupled to the catalyst reactor 3, wherein the catalyst load 2 coming through the catalyst receiving port 6 into the receptacle 4 is evenly distributed within the catalyst reactor 3 by the catalyst distribution disc 10.

Figure 8:
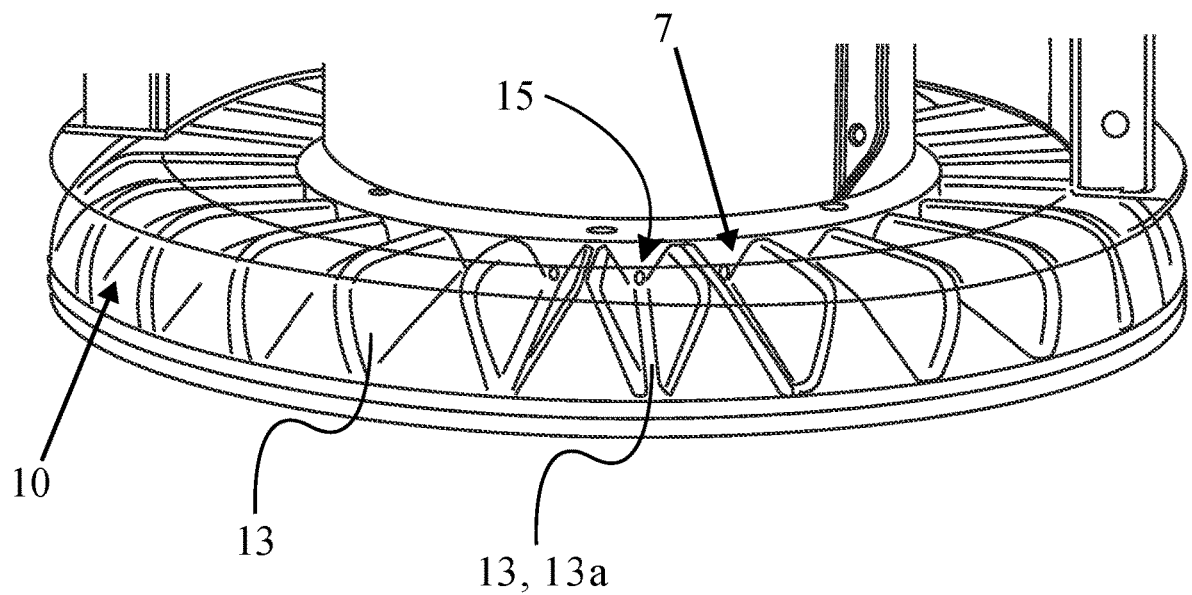
FIG. 8 is a zoomed in view of a catalyst distribution disc according to the present invention.
Figure 9:
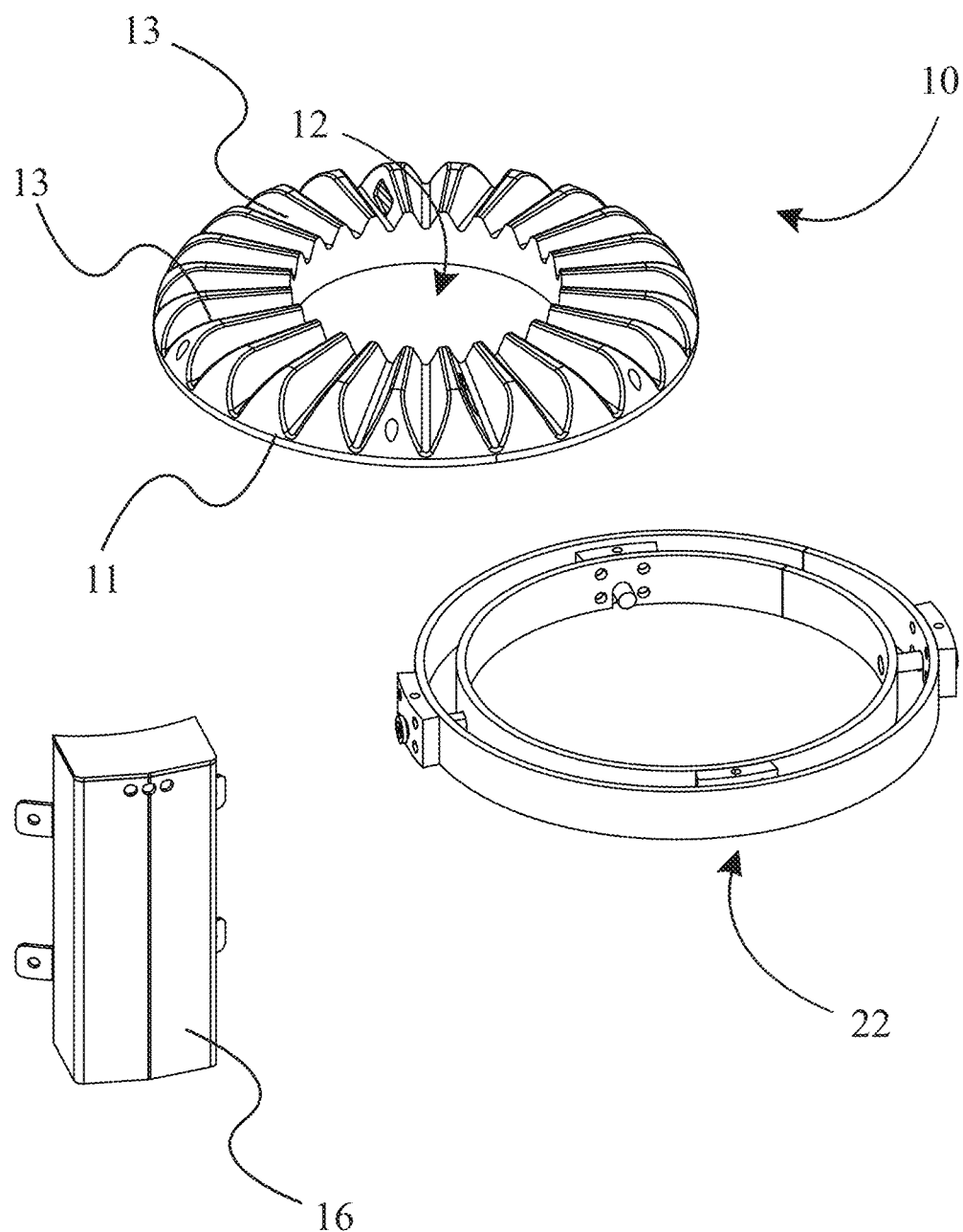
FIG. 9 is a top front perspective view illustrating accessories of the present invention, such as the catalyst distribution disc, part of a gyroscopic system, and the motor compartment.
Figure 10:
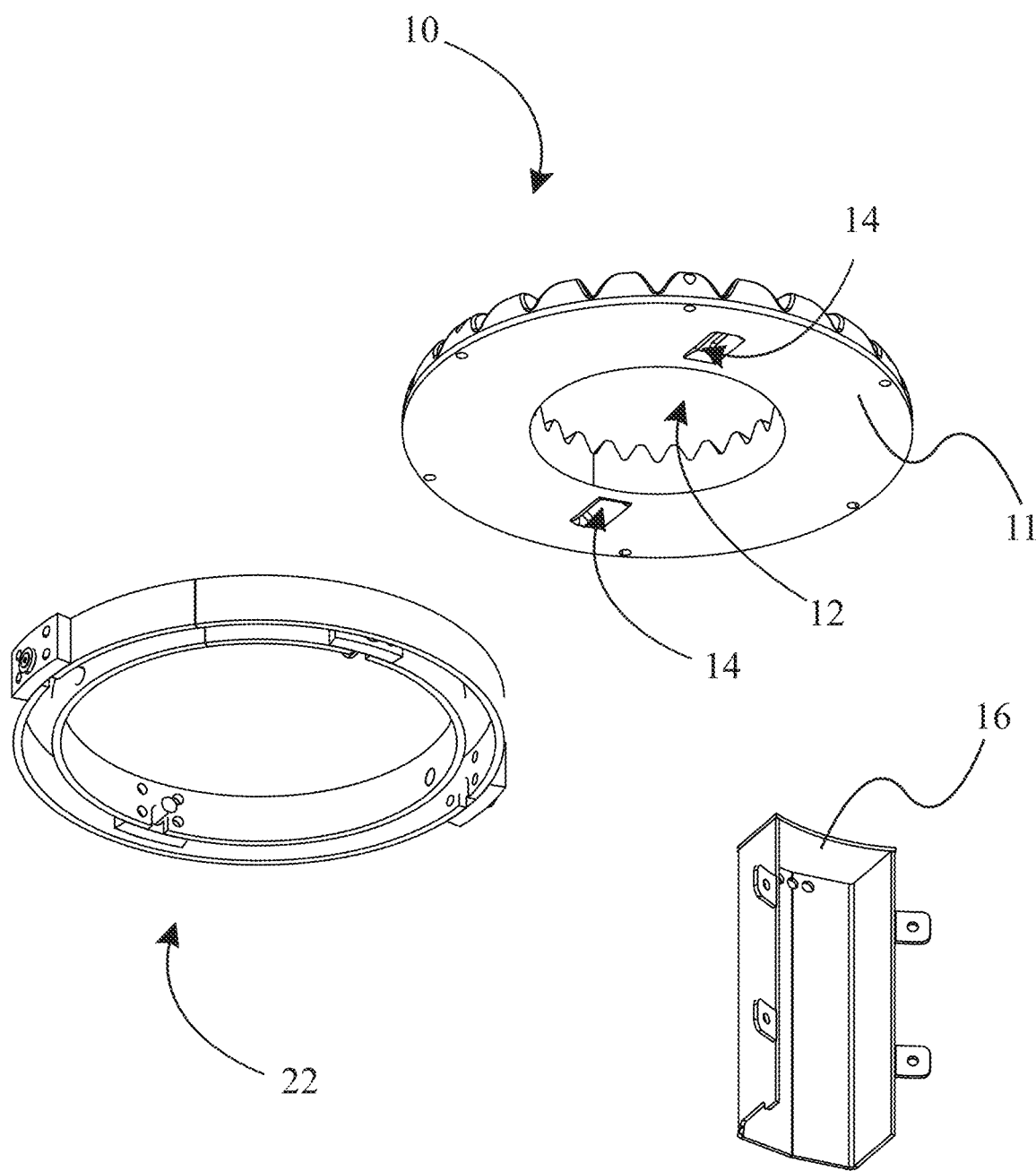
FIG. 10 is a bottom perspective of the accessories shown in FIG. 9.

A more detailed description of the present invention follows. In the preferred embodiment, the catalyst distribution disc 10 is a circular disc that is designed to evenly distribute catalyst within the catalyst reactor 3. Accordingly, the catalyst distribution disc 10 comprises a disc surface 11, a central aperture 12, a plurality of grooves 13, and a plurality of slots 14. Preferably, the central aperture 12 traverses centrally through the disc surface 11. In other words, the catalyst distribution disc 10 has a large center hole. The top surface of the catalyst distribution disc 10 can be described as a wavy structure, that has linear grooves that are running from the center of the disc to the outer side of the disc. In other words, as seen in FIG. 8 through FIG. 10, the plurality of grooves 13 is evenly and radially distributed around the disc surface 11, and the plurality of grooves 13 is evenly and circularly distributed apart from one another. The plurality of grooves 13 are not restricting natural expansion of the air discharged from the holes of the sparger system 7. At the same time, all the catalysts delivered to the main body of the machine (the receptacle 4) is directed into the plurality of grooves.

As can be seen in FIGS. 9 and 10, the catalyst distribution disc 10 further comprises two rectangular holes or the plurality of slots 14. The two rectangular holes penetrate from the top surface of the catalyst distribution disc 10 to the bottom surface of the catalyst distribution disc 10 or in other words, the plurality of slots 14 traverse through the disc surface 11. Preferably, the two rectangular holes or plurality of slots 14 are utilized as a mechanism for distributing catalyst into hard-to-reach areas such as the center base of a catalyst reactor 3. In the preferred embodiment, the plurality of grooves 13 is V-shaped, the plurality of slots 14 is rectangular, the central aperture 12 is circular and the disc surface 11 is circular. However, the catalyst distribution disc 10 may comprise any other size, shape, components, arrangement of components etc. that are known to one of ordinary skill in the art, as long as the intents of the present invention are not altered.

Figure 11:
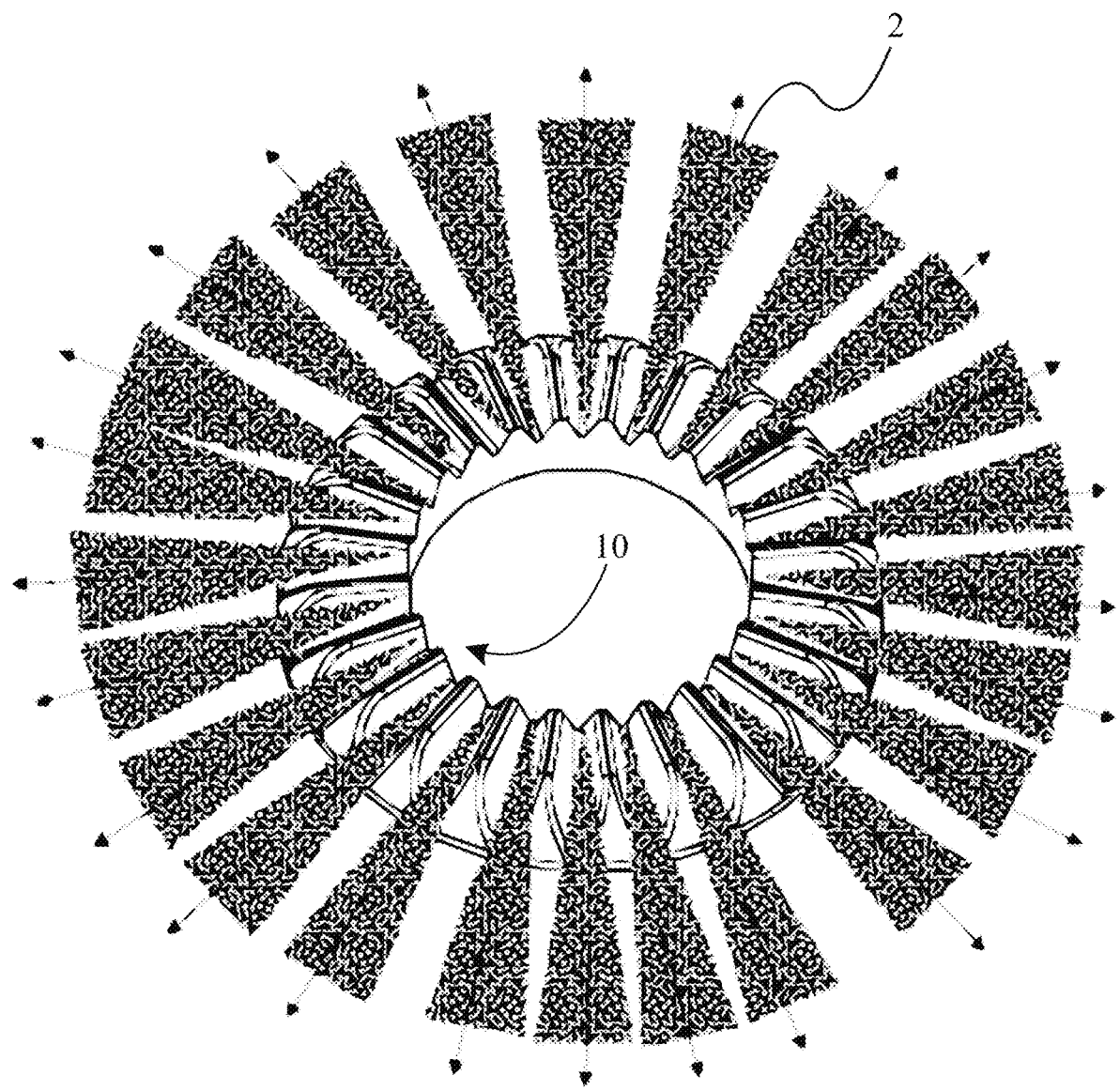
FIG. 11 is an illustration of catalyst spreading along the catalyst distribution disc.

In reference to FIG. 6, the sparger system 7 comprises a plurality of sparger holes 15. Preferably, each of the plurality of sparger holes 15 is aligned to a corresponding groove 13a, wherein the corresponding groove 13a is from the plurality of grooves 13. This is so that propelling air/nitrogen is supplied through the plurality of sparger holes 15 which are aligned with the plurality of grooves 13 of the catalyst distribution disc 10, pushes the catalysts and ensures that no catalyst rest on top of the distribution disc 10, as seen in FIG. 11.

As seen in FIG. 2 through FIG. 7, FIG. 9 and FIG. 10, the motor system 9 comprises at least one motor compartment 16, and at least one pneumatic motor 17, wherein the at least one pneumatic motor 17 is mounted within the at least one motor compartment 16. In other words, the at least one motor compartment 16 houses the at least one pneumatic motor 17 and protects it from outside elements. In the preferred embodiment, and as seen in FIG. 2 through FIG. 6, the at least one motor compartment 16 and the at least one motor 17 are mounted outside the receptacle 4. More specifically, two pneumatic motors, (one main motor and one back up motor) are mounted adjacent to an outer wall of the receptacle 4, on opposing sides of the receptacle 4. This arrangement enables easy access for users to the motors in case users need to change it (users just switch from one motor to the other motor). Further, this arrangement also protects the motors since they are not exposed to the catalyst. Exposure to catalyst may lead to motors getting damaged.

In reference to FIG. 7, an alternate embodiment of the present invention is shown, wherein the at least one motor compartment 16 and the at least one motor 17 are mounted within the cavity 5 of the receptacle 4. In this embodiment, the at least one motor compartment 16 is mounted adjacent to the second end of the receptacle 4b, wherein the at least one motor 17 is housed within the motor compartment 16.

Figure 12:
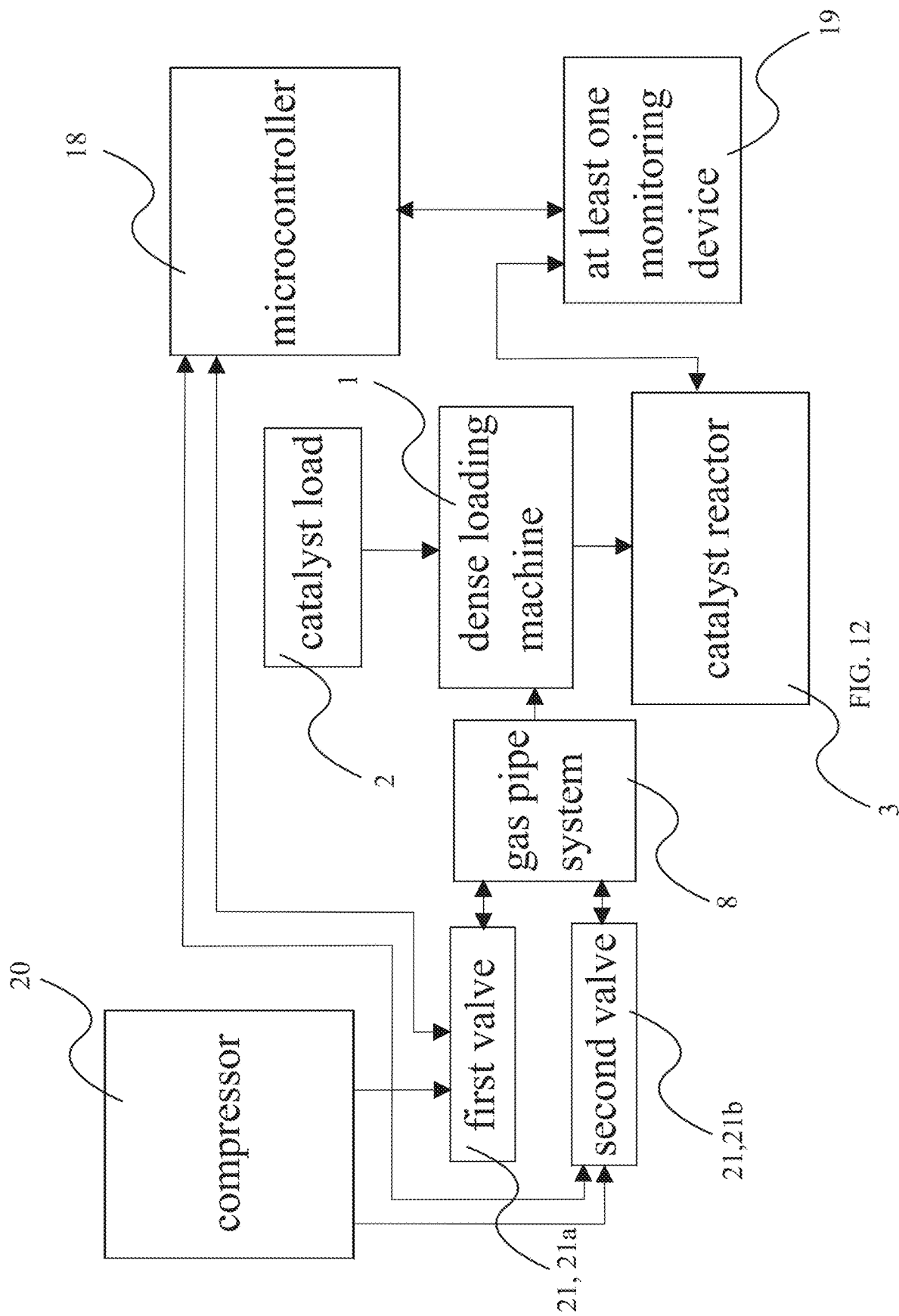
FIG. 12 is a schematic diagram of operation of an automated dense loading system, according to the present invention.
Figure 13:
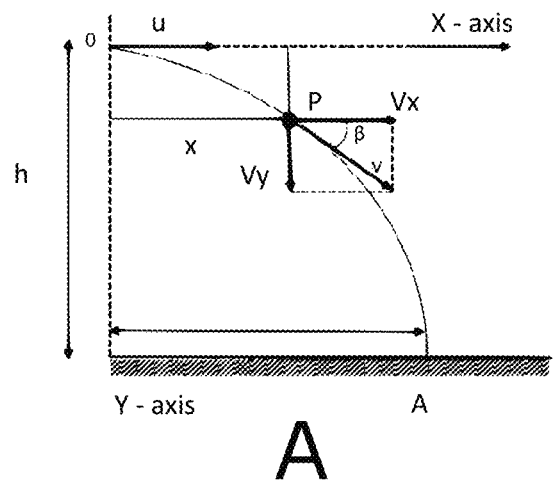
FIG. 13 is an illustration of a trajectory of a horizontal projectile (A), centrifugal force (B), and particle velocity (C).
Figure 13:
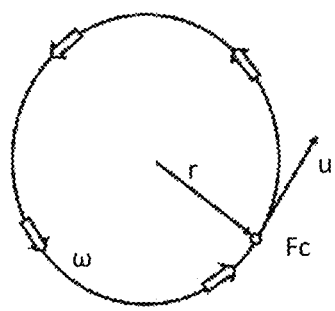
Figure 13:
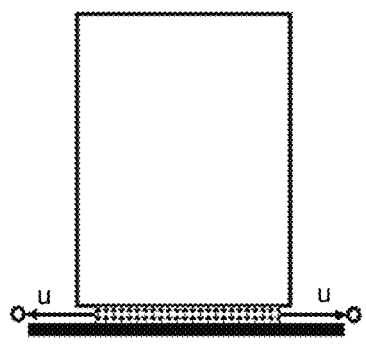

It is an objective of the present invention to operate in a manual catalyst distribution mode and an automatic catalyst distribution mode. In other words, the present invention is able to be utilized manually or automatically. When the present invention is in autonomous mode, the present invention can interact with the catalyst bed below and adjust the loading pattern according to the information received from the interaction as shown in FIG. 12. The systematic settings and operations of autonomous mode of the present invention is shown in FIG. 12. More specifically, in an automatic catalyst distribution mode the present invention comprises a microcontroller 18, at least one monitoring unit 19, a compressor 20, and a plurality of valves 21. The microcontroller 18 is a processing unit that controls all the electric and electronic components of the present invention. To that end, the microcontroller 18 is electronically coupled to the at least one monitoring unit 19 and the plurality of valves 21.

Preferably, the present invention is powered by air/nitrogen from the compressor 20. The working gas coming from the compressor 20 is used for the propelling of the catalyst load 2 as well as to power the pneumatic motor 17, turning the distribution plate 10 of the machine. Accordingly, the air streams are delivered to the machine through two independent piping systems. The rates of the air/nitrogen used for propelling of the catalyst (catalyst loading) are controlled by the plurality of valves 21 that are automated. To that end, a first valve 21*a* from the plurality of valves 21 is connected to the sparger system 7, and a second valve 21*b* from the plurality of valves 21 is connected to the motor system 9. The valve opening percentage depends on the distance to the catalyst surface below the dense loading machine and catalyst reactor diameter. The distance to the catalyst bed is measured by the at least one monitoring unit 19. Preferably, the at least one monitoring unit 19 is an ultrasound and/or infrared camera system. However, any other monitoring system that are known to one of ordinary skill in the art may be used, as long as the intents of the present invention are not altered. To accomplish measurement, the at least one monitoring unit 19 is mounted within the catalyst reactor 3. Furthermore, the microcontroller 18 is operably coupled to the plurality of valves 21, wherein dimensions of each of the plurality of valves 21 are controlled by the microcontroller 18, based on readings from the at least one monitoring unit 19. More specifically, the distance information is delivered to the microcontroller 18 which uses a code to calculate the velocity of the particles needed to reach the horizontal distance equivalent to the radius of the loaded catalyst reactor 3. The code is using calculations for trajectory of a horizontal projectile, as shown in FIG. 13 (A), as base for valve opening adjustment. The code equation is fitted with the loading factor which depends on the catalyst shape and mass. The loading factor is adjusted at the beginning of every loading and depends on the catalyst size and shape.

When the present invention is being operated in the manual mode, the plurality of valves 21 may be manually adjusted according to the height of the catalyst bed.

In reference to FIG. 13, an illustration of a trajectory of a horizontal projectile (A), a centrifugal force (B), and particle velocity (C) is shown. The trajectory of the sprayed catalyst pallets depends on the spinning/blowing speed and rates. In addition, the trajectory as shown in FIG. 13A is showing catalyst pallets that have a horizontal projectile. If the dense loading machine is dispensing catalyst pallets while spinning, centrifugal forces of the spinning elements will propel the catalyst pallets with the initial velocity as shown in FIG. 13B. In reference to FIG. 13C, an illustration of initial particle velocity for catalyst blowing machines is shown. In addition to FIG. 13A, the horizontal distance in which the catalyst pallets and particles will land depends on three primary factors. The three factors are weight of the particle/catalyst pallets, initial velocity, and the distance to the loaded bed. Thus, according to the preferred embodiment, the present invention may be equipped with technology allowing the machine to be in continuous interaction with the loaded catalyst below it and, based on the information received, to automatically adjust the catalyst spraying and distribution. Further, the present invention may be fixed and installed above the catalyst bed or can be installed on a telescopic system. Moreover, the present invention can be used for dense loading of axial and radial flow reactors.

Continuing with the preferred embodiment, the present invention is equipped with a gyroscopic system 22 which assure horizontal orientations of catalyst spreading disc which prevents sloping of the loaded catalyst bed. In other words, the gyroscopic system 22 is operably coupled to the catalyst distribution disc 10, wherein the gyroscopic system 22 ensures horizontal orientation of the catalyst distribution disc 10. Thus, the present invention includes gyroscopic auto alignment of the distribution disc 10, thereby ensuring an even catalyst bed.

In order to inspect the cavity 5, as well as to perform maintenance on the different components and alignments, the present invention comprises at least one inspection gate 23. Preferably, the at least one inspection gate 23 is laterally positioned along a longitudinal segment 4c of the receptacle 4, wherein the at least one inspection gate 23 allows opening and closing of the receptacle 4 along the longitudinal segment 4c of the receptacle 4.

Figure 3:
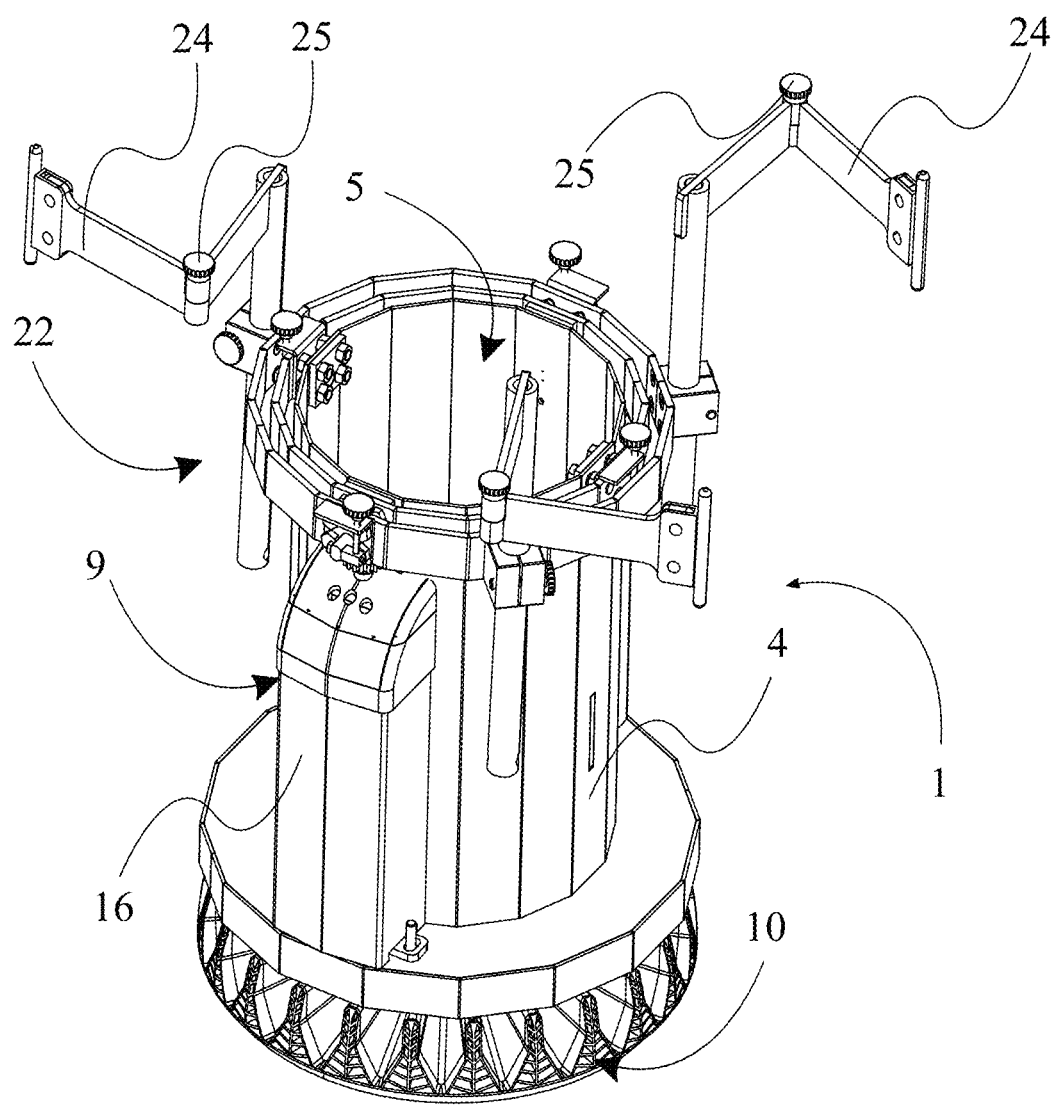
FIG. 3 is a top front left perspective view of the dense loading machine without a gas piping unit.
Figure 4:
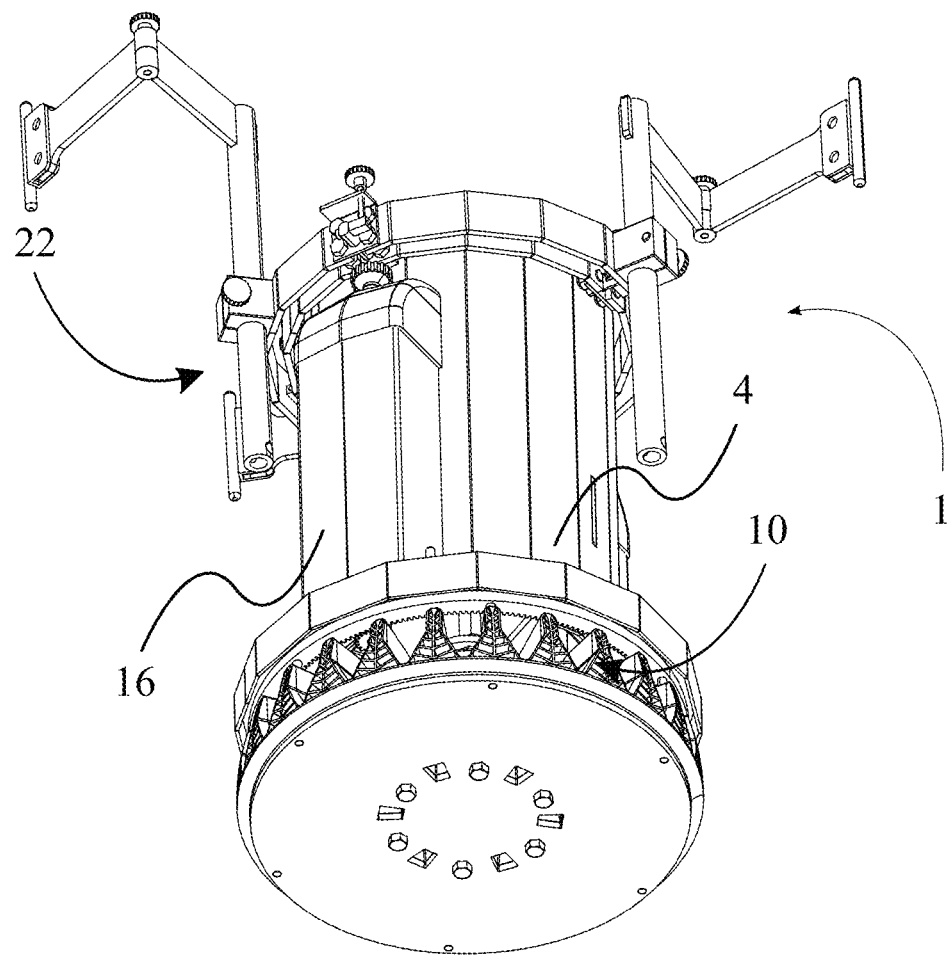
FIG. 4 is a bottom perspective view of the dense loading machine.
Figure 5:
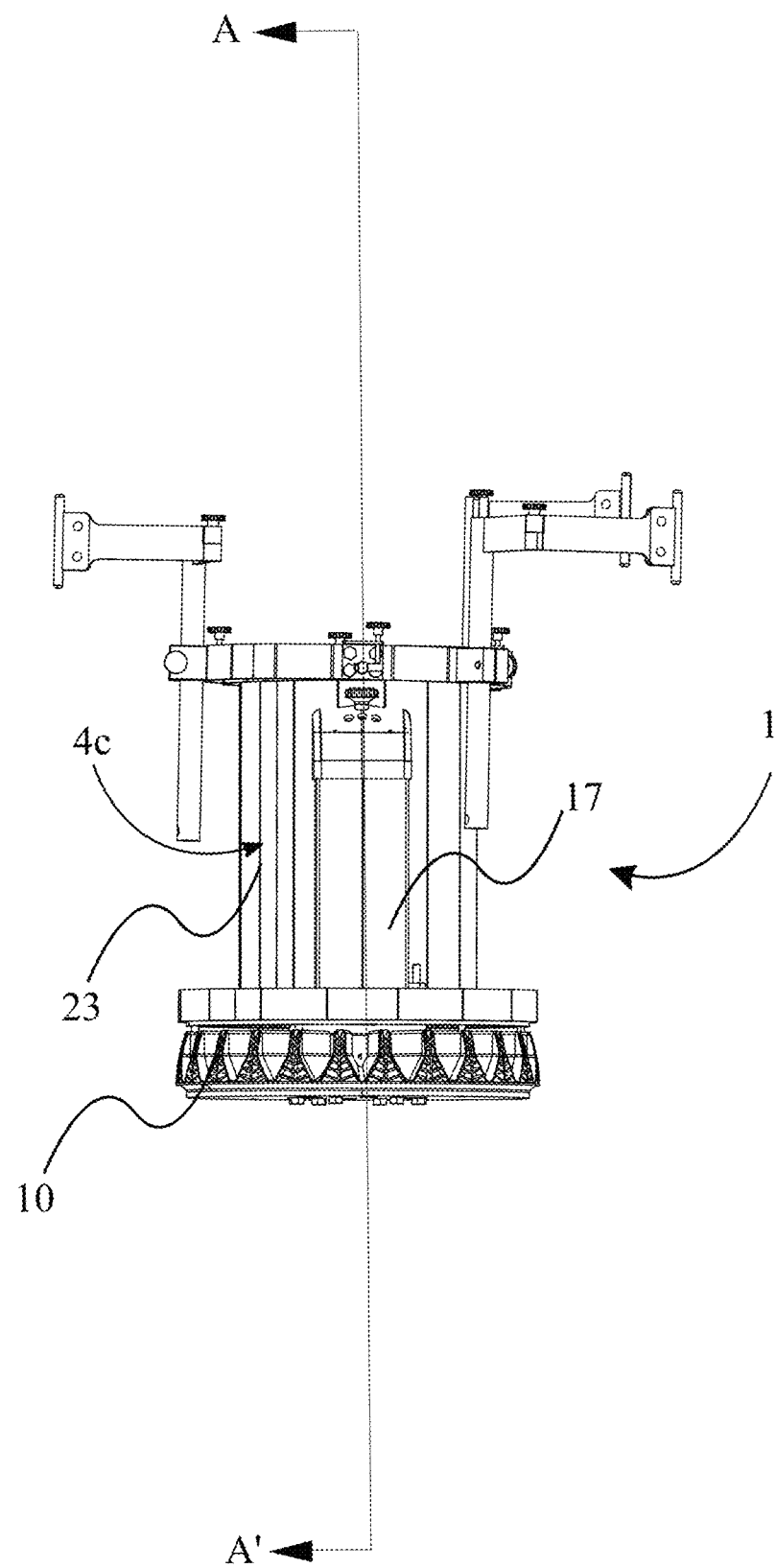
FIG. 5 is a left side elevational view of the dense loading machine.

As seen in FIG. 3 through FIG. 5, the present invention further comprises a plurality of sliding legs 24 and a plurality of adjustment knobs 25. Preferably, the plurality of sliding legs 24 are mounted perimetrically around the receptacle 4. Further, the plurality of adjustment knobs 25 is integrated within the plurality of sliding legs 24. In the preferred embodiment, the plurality of sliding legs 24 is used to center the dense loading machine 1 along a transverse cross section of the catalyst reactor 3. In other words, the plurality of sliding legs 24 and plurality of adjustment knobs 25 are operably coupled to the dense loading machine 1, wherein operating the plurality of sliding legs 24 and the plurality of adjustment knobs 25 governs horizontal motion of the dense loading machine 1 along a transverse cross section of the catalyst reactor 3. More specifically, the dense loading machine 1 is placed in a manway space and the plurality of sliding legs are placed on a tray or catalyst support grid. When the plurality of adjustment knobs 25 is untightened, the dense loading machine 1 may be horizontally slid in all directions, so as to place it in the center of the catalyst reactor's 3 cross section. When it is centered the plurality of adjustment knobs 25 are tightened and the dense loading machine 1 is fixed at the position.

Figure 14:
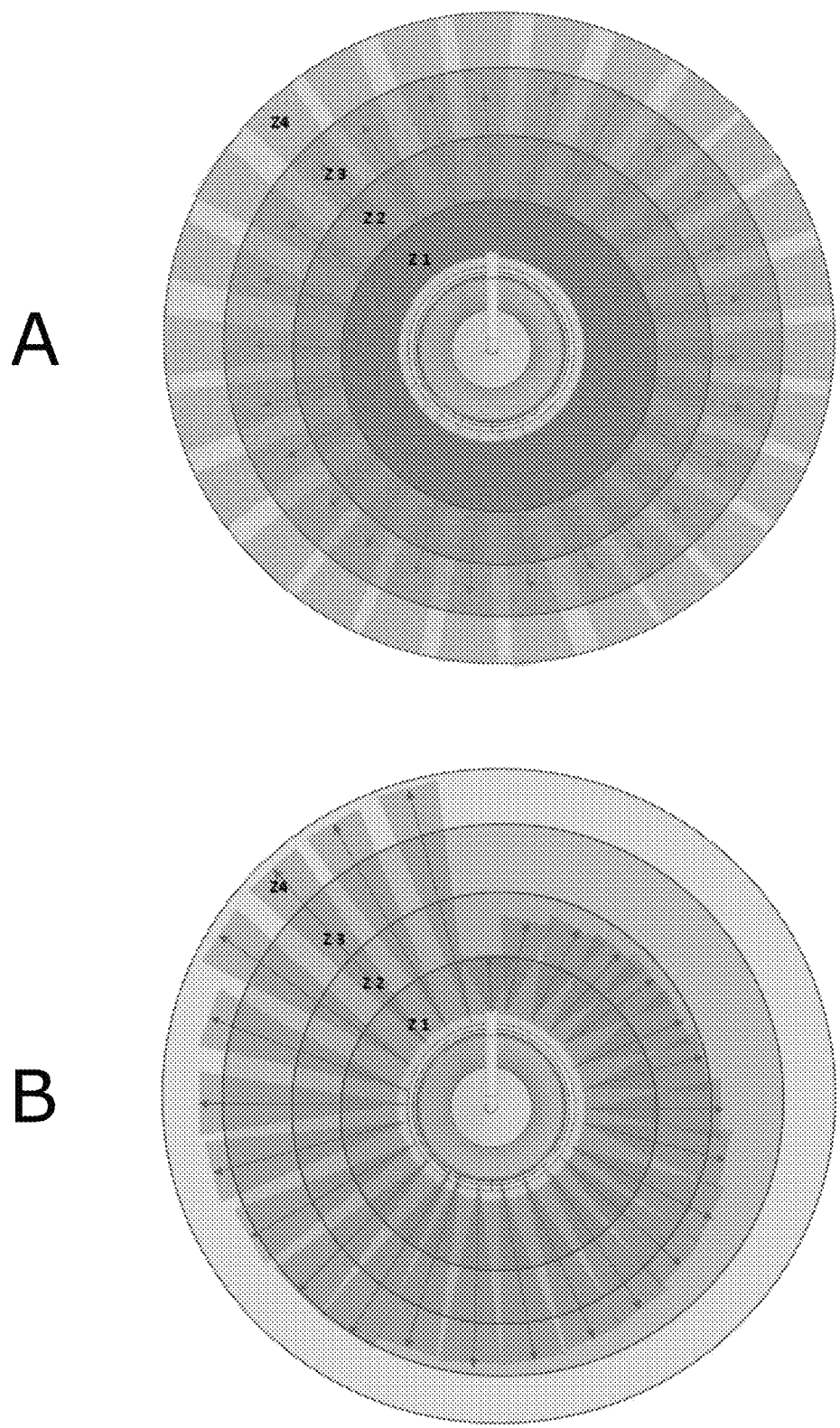
FIG. 14 is an illustration showing the distribution of catalyst from the catalyst distribution disc through a uniform sparger (A) and a snail sparger (B).

In reference to FIG. 14, a catalyst distribution pattern according to the present invention is shown. According to the preferred embodiment, the sparger system 7 comprises at least one of a uniform sparger and a snail sparger. The uniform sparger has all discharge holes of the same size. The snail sparger has holes of different sizes and scaled from smallest to largest around the sparger perimeter. The uniform sparger will deliver catalyst to the same perimeter at the same time as illustrated in FIG. 14A. The snail sparger will distribute the catalyst at the same time to the different zones of the reactor cross-section as shown in FIG. 14B. As the distribution plate and sparger rotate the catalyst will be delivered to all zones during one rotational period.

Figure 15:
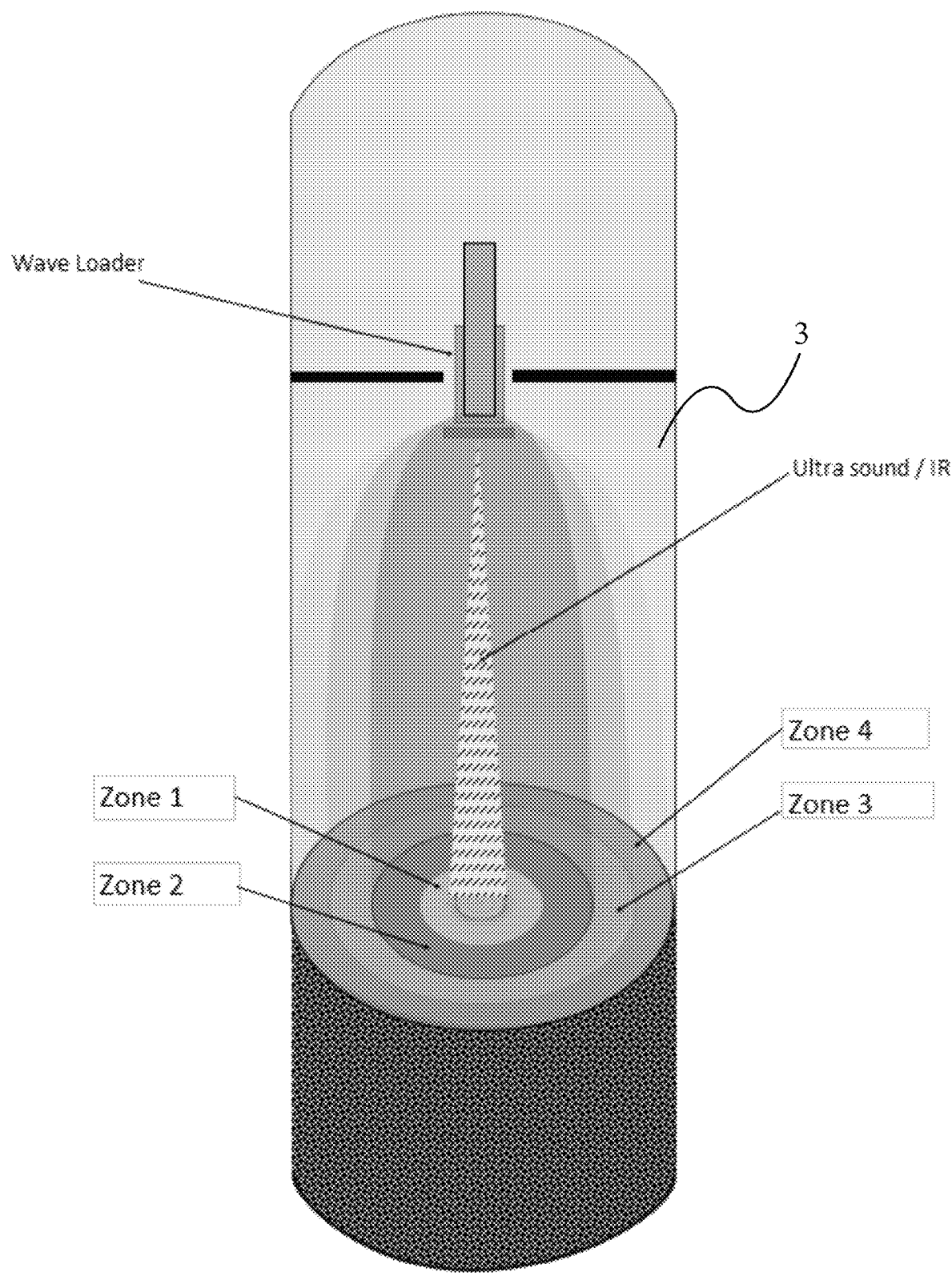
FIG. 15. is an illustration of wave loading according to the present invention.
Figure 16:
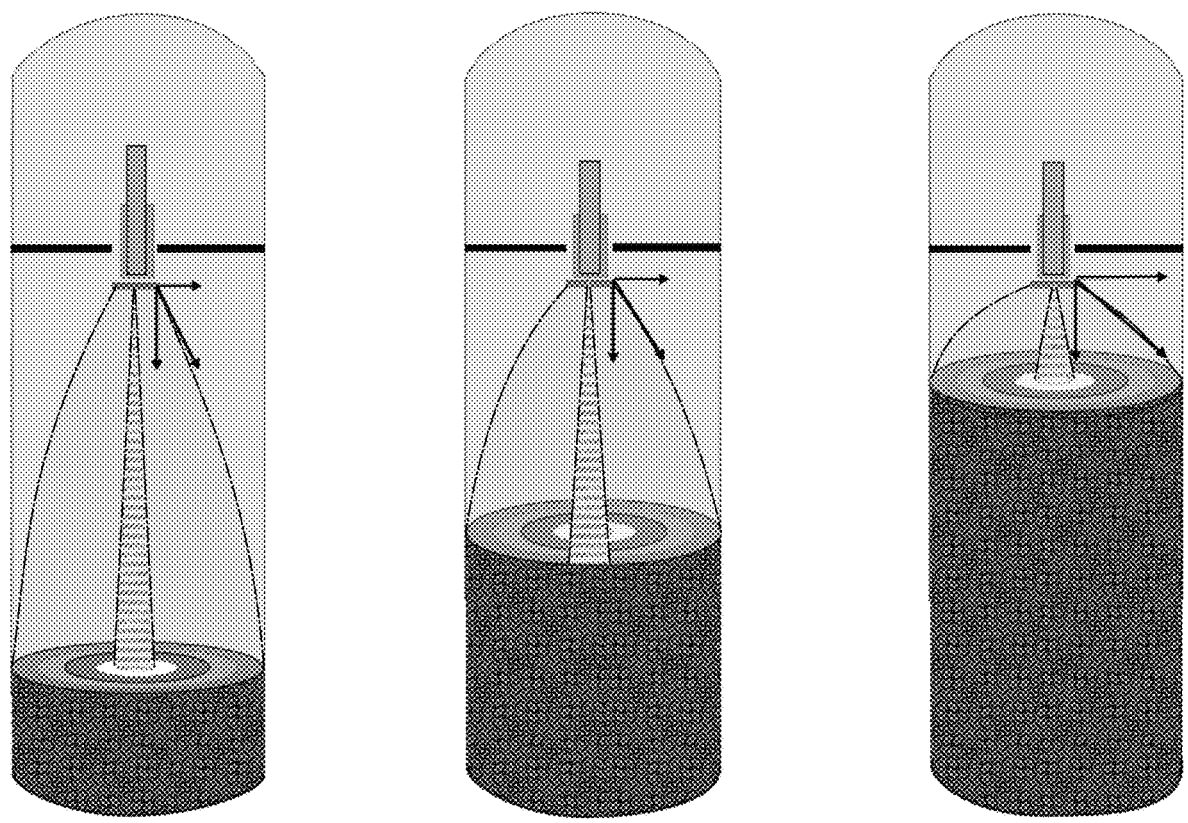
FIG. 16 is an illustration of the axial loading control of the present invention.

A detailed look into the method of loading and different loading patterns according to the present invention follows. When the present invention is in autonomous mode, the present invention can interact with the catalyst bed below and adjust the loading pattern according to the information received from the interaction as shown in FIG. 15. In reference to FIG. 16, the axial loading control system of the present invention is shown. As the catalyst is loaded to the catalyst bed, the distance between the dense loading machine and catalyst bed is decreasing. To maintain uniform loading of the catalyst over the bed cross-section, the discharge velocity of the catalyst must be increased continuously. The discharge velocity of the catalyst is increased by increasing the valve opening which will increase the flow of propelling gas to the dense loading machine.

Figure 17:
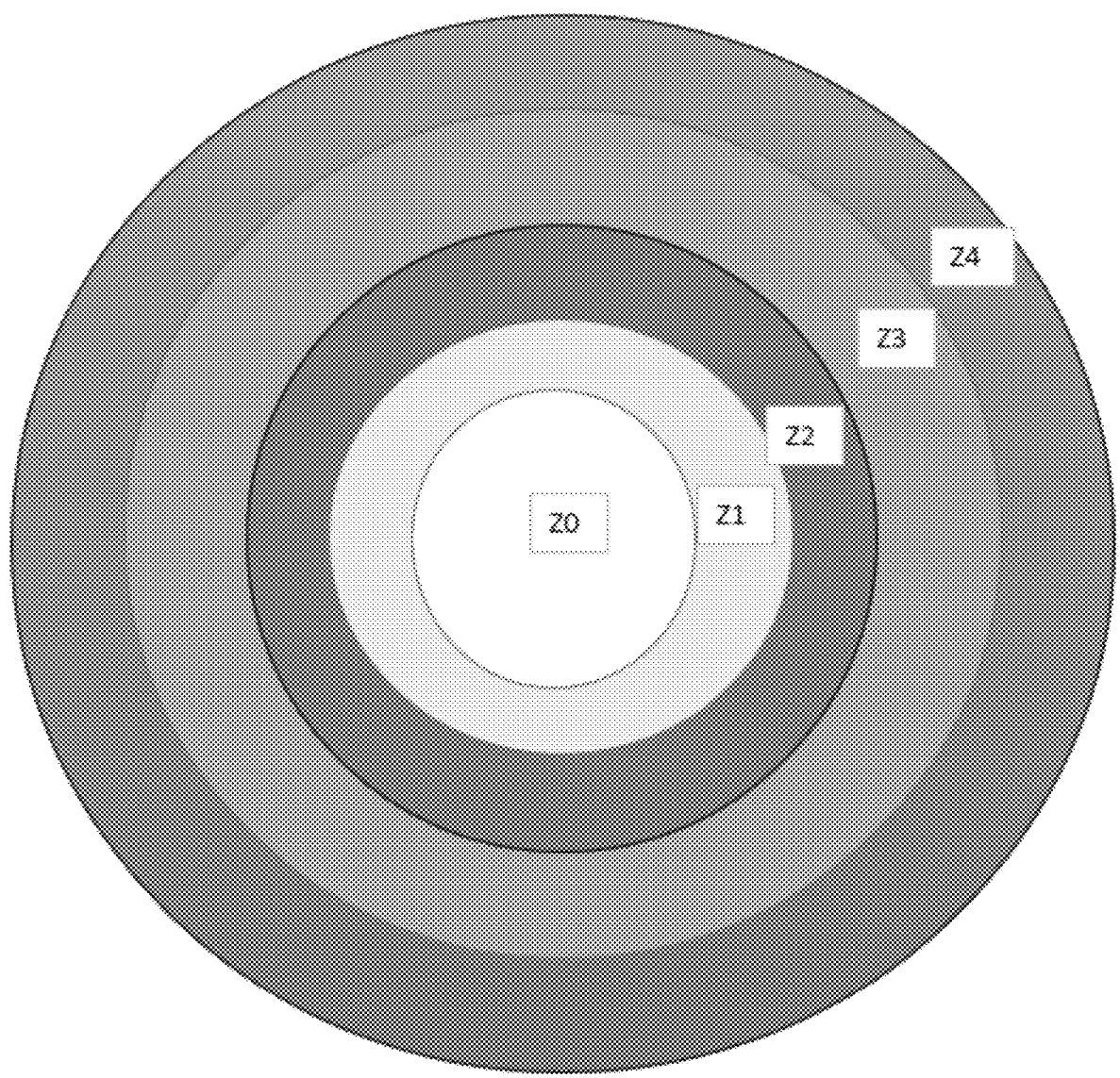
FIG. 17 is an illustration of the loading zones within a catalyst reactor.
Figure 18:
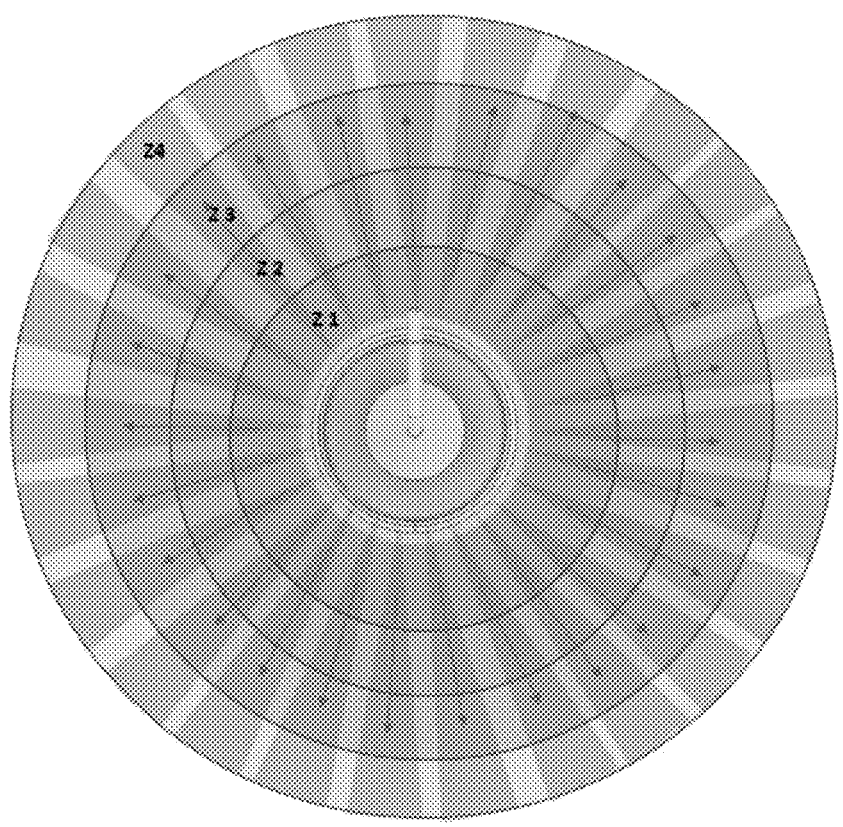
FIG. 18 is an illustration showing loading pattern within a catalyst reactor.
Figure 18:
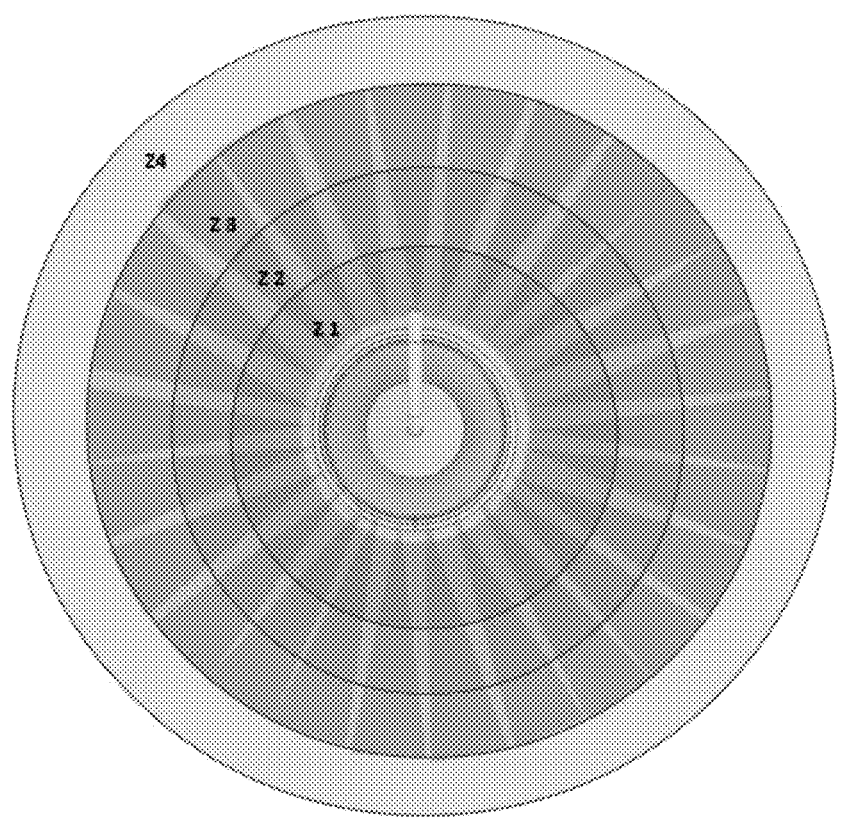
Figure 19:
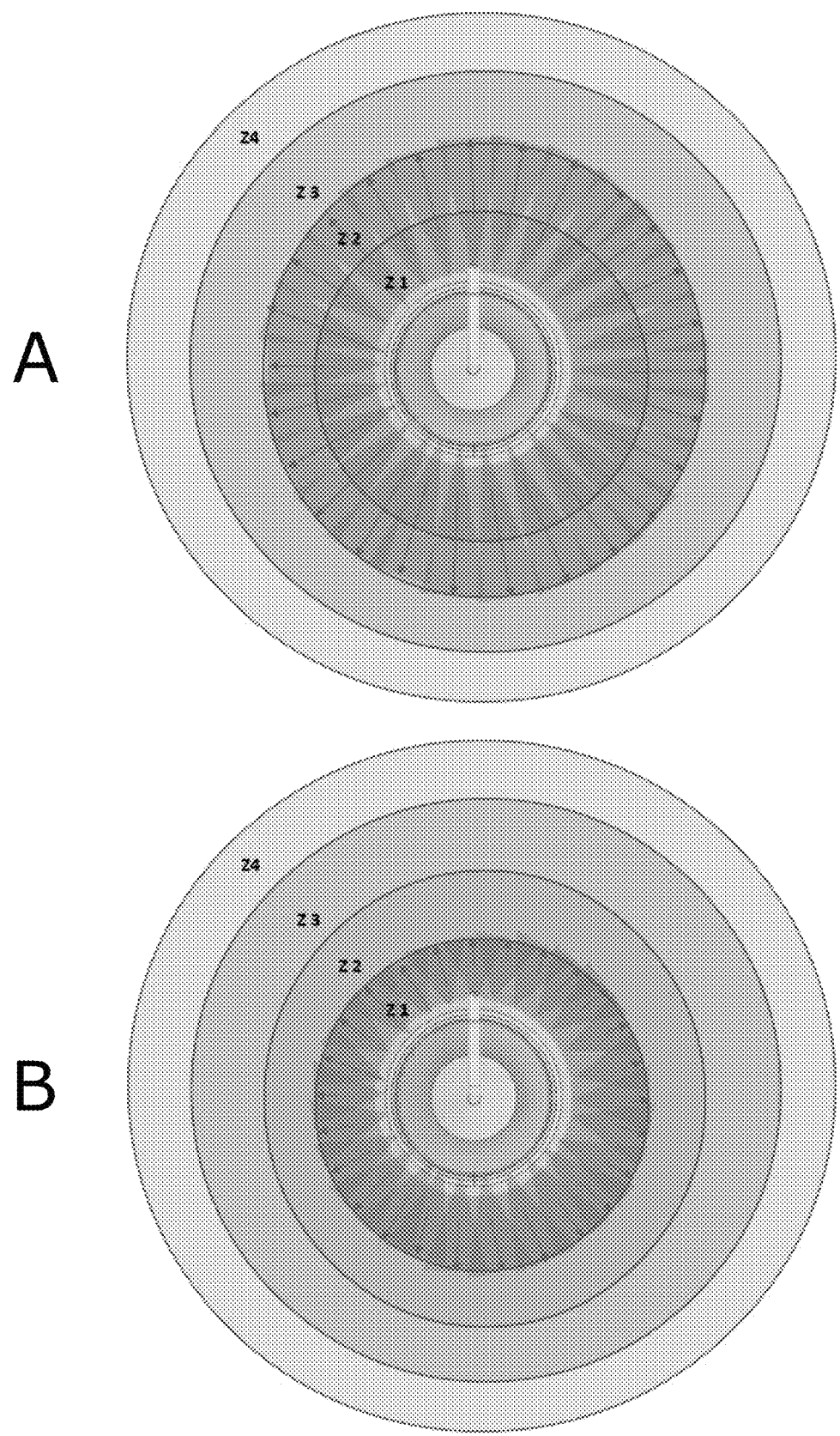
FIG. 19 is an illustration showing loading pattern within a catalyst reactor.
Figure 20:
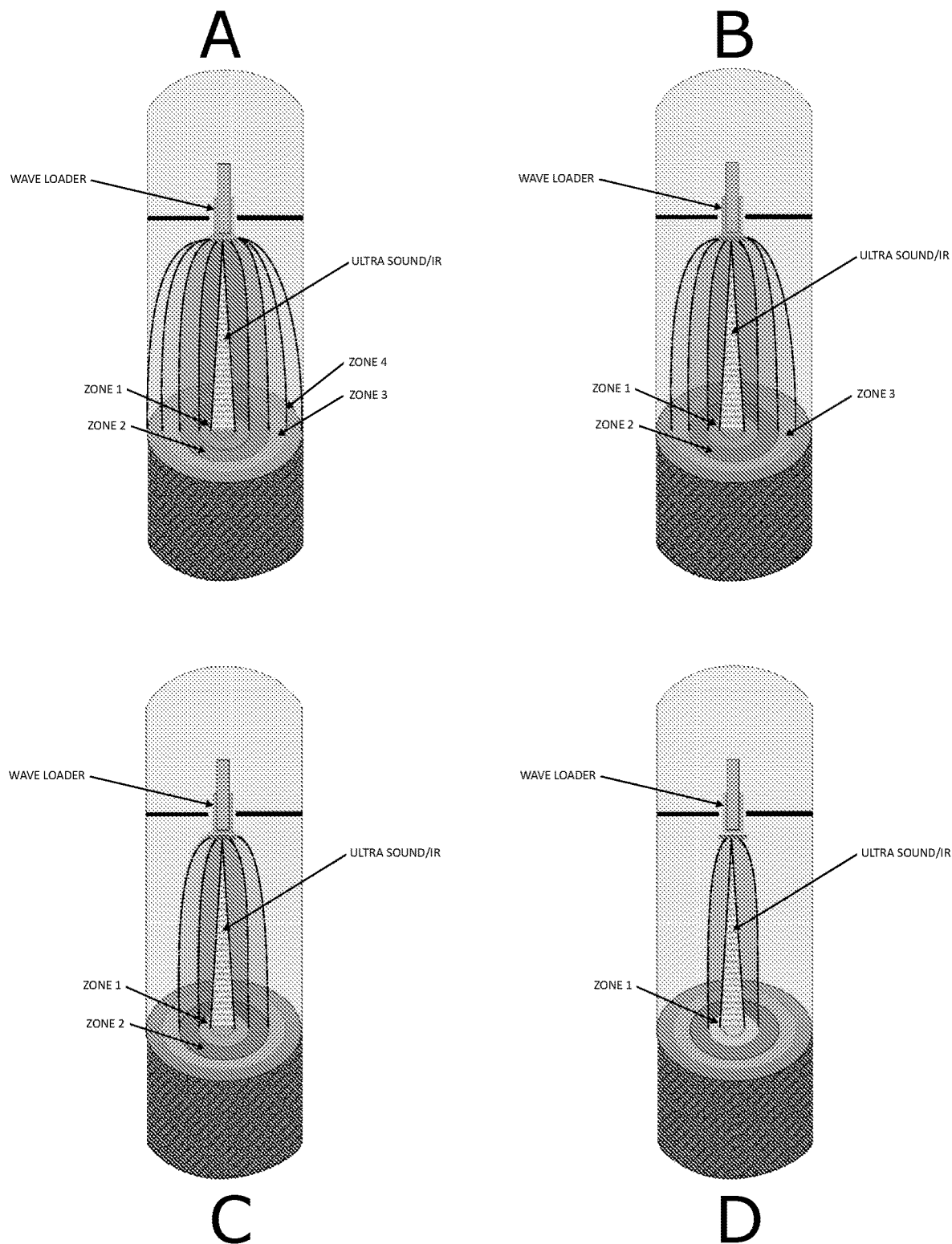
FIG. 20 is an illustration showing the loading process of the present invention.

In reference to FIG. 17, an illustration of the loading zone on a catalyst bed is shown. All catalyst propelled from the catalyst spreading disc does not have the same initial velocity. Some of the catalyst is directly impacted by the air jet from the sparger holes and some is dragged/pushed by other catalyst affected by the air jet. Thus, all catalysts would not have the same trajectory, but it will range from almost zero in the Y-axis to the catalyst reactor perimeter. If the bed cross-section is divided into zones, as illustrated in FIG. 17, it can be seen that the amount of catalyst needed to be delivered to each of the zones is different and is increasing from the center towards the perimeter of the catalyst reactor. As initial velocities of the propelled catalyst are not uniform, the falling distances would also be different. The velocity distribution is following natural distribution curve. Thus, the landing profile will have tendency to be uniform but with a lot of uncertainties. To assure that the profile of the loaded bed is uniform, the present invention has built in a wave function. When the catalyst bed reaches one height, the valve opening is readjusted to spray the catalyst close to the catalyst reactor's wall. The percentage of the valve opening is kept for a few seconds and then it is slightly ramped down targeting zones close to the reactor center as illustrated in FIG. 18 and FIG. 19. When the catalyst spraying distance reaches the minimum, the gas rates are ramped up. The catalyst is loaded in waves. The wave loading process is illustrated by FIG. 18 through 20. First, the propelling gas rates are adjusted so that the sprayed catalyst reaches the perimeters of the catalyst reactor as shown in FIG. 18A. Next, the propelling gas rates are decreased, and the propelled catalyst will be sprayed over smaller radius than the initial set-up as shown in FIG. 18B. Ramping the gas rates down, the catalyst will be sprayed on smaller areas that are closer towards the center of the catalyst reactor as shown in FIG. 19A. The gas rates are decreased to the minimum to deliver catalyst to the areas close to the center only. Once the delivery of catalyst successfully reached the center of the catalyst reactor, the gas rates are ramped up again to the maximum. As the areas close to the center are smaller than the areas towards the perimeter of the catalyst reactor, the time the loading wave is targeting one area is proportional to the ratio of that area and are of reactor cross-section. The same loading system can be used for the present invention with uniform spargers and snail spargers.

Figure 21:
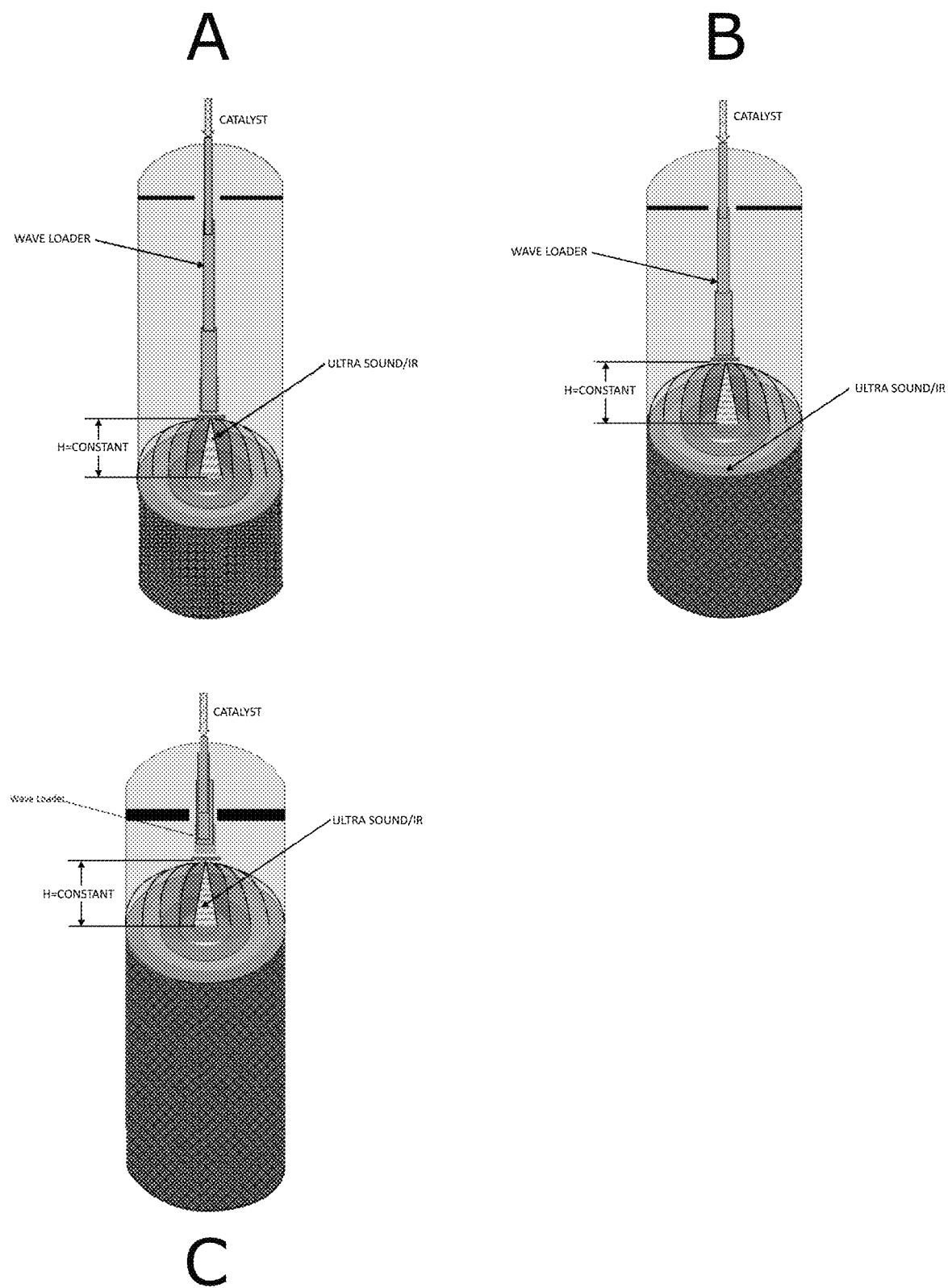
FIG. 21 is an illustration alternative arrangement of the present invention.

In reference to FIG. 21, an illustration of alternative arrangements of the present invention is shown. Beside conventional positioning of the dense loading machine and fixing it to the reactor internals above the catalyst bed, the present invention can be fitted to a telescopic catalyst delivery system. The machine would keep constant distance to the bed and the telescopic system would automatically retract as the bed height is increased. The ultrasound/infrared camera distance measuring element will control the retraction of the telescopic system as illustrated in FIG. 21.

Figure 22:
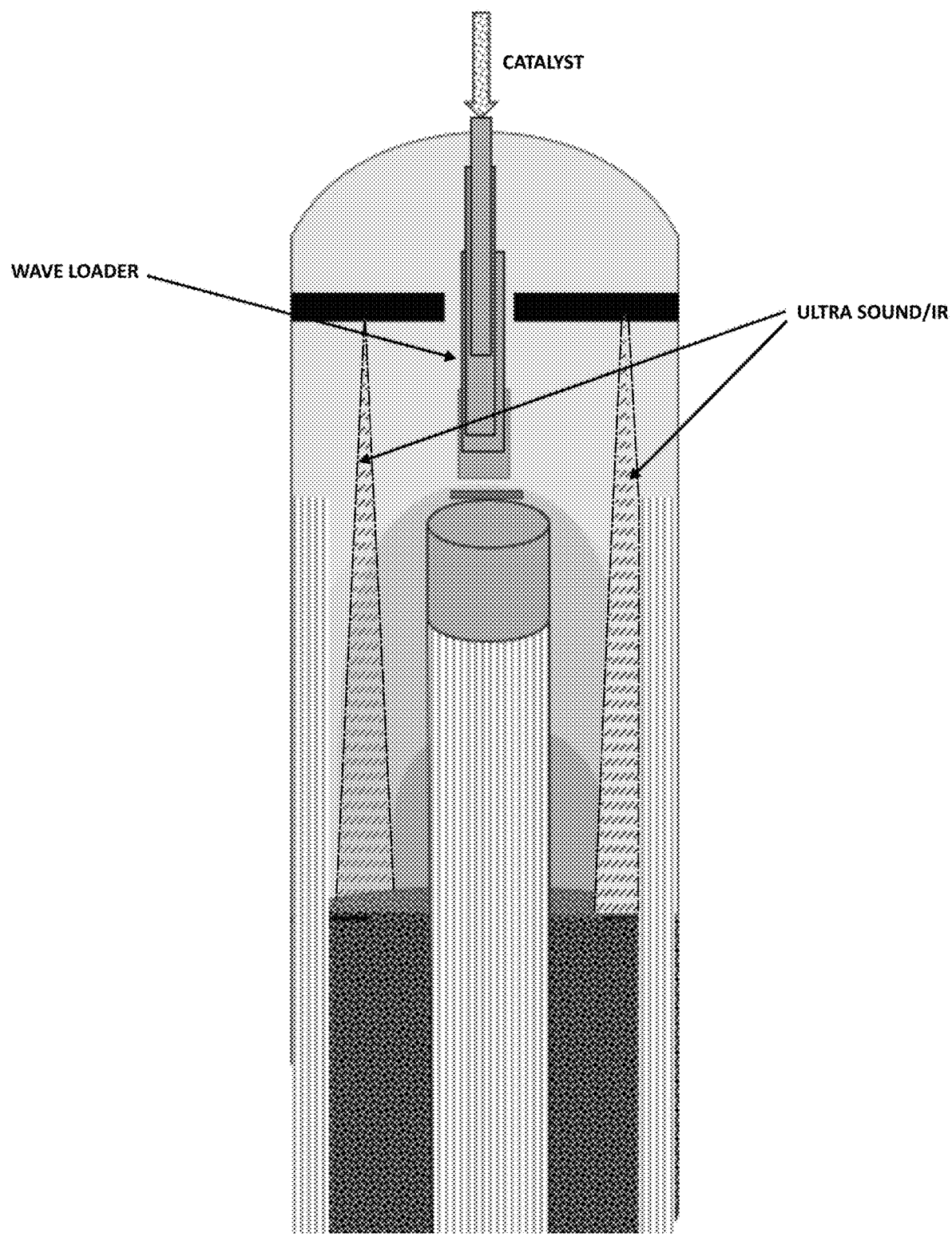
FIG. 22 is an illustration showing a radial flow reactor.

In reference to FIG. 22, an illustration of a radial flow reactor is shown. In other words, according to the present invention, the catalyst coming through catalyst distribution disc are loaded in radial waves. The present invention is ideal for dense loading of radial flow reactors. The present invention would be placed above the center of the center basket and the distribution disc 10 would not have any openings for catalyst discharge as illustrated by FIG. 22. The catalyst is propelled to the catalyst space between the wall scallops and center basket in waves to make sure that the loaded profile is flat. The distance to the catalyst bed is measured by ultrasound/infrared and the rates of the propelled gas would be adjusted by controlling of the gas valve.

Thus, the present invention is an efficient dense loading system that has multiple unique features, such as being able to load in radial waves, catalyst dispersion with a unique distribution disc, hybrid distribution of catalyst—pneumatic and rational, targeted area loading, and gyroscopic auto alignment.

Although the invention has been explained in relation to its preferred embodiment, it is to be understood that many other possible modifications and variations can be made without departing from the spirit and scope of the invention as hereinafter claimed.

What is claimed is:

1. A dense loading system comprising:
a dense loading machine;
a catalyst load;
a catalyst reactor;
the dense loading machine comprising a receptacle, a cavity, a catalyst receiving port, a motor system, a gas piping system, a sparger system, and a catalyst distribution disc;
the dense loading machine being mounted within a loading aperture of the catalyst reactor;
the cavity traversing into the receptacle;
the cavity extending from a first end of the receptacle towards a second end of the receptacle wherein the first end is positioned opposite to the second end across the receptacle;
the catalyst receiving port delineating the first end of the receptacle;
the catalyst distribution disc being mounted adjacent to the second end of the receptacle;
the sparger system being mounted within the cavity adjacent to the second end of the receptacle;
the gas piping system being in fluid communication with the sparger system and the motor system;
the sparger system being operably aligned to the catalyst distribution disc, wherein gas from the gas piping system is distributed along the catalyst distribution disc through the sparger system;
the catalyst distribution disc being operably coupled with the motor system, wherein operating the motor system governs rotational motion of the catalyst distribution disc;
the catalyst distribution disc being rotatably coupled around the receptacle; and
the dense loading machine being operably coupled to the catalyst reactor, wherein the catalyst load coming through the catalyst receiving port into the receptacle is evenly distributed within the catalyst reactor by the catalyst distribution disc.

2. The dense loading system of claim 1, wherein the catalyst distribution disc comprising:
a disc surface;
a central aperture;
a plurality of grooves;
a plurality of slots;
the central aperture traversing centrally through the disc surface;
the plurality of grooves being evenly and radially distributed around the disc surface; and
the plurality of slots traversing through disc surface.

3. The dense loading system of claim 2, wherein:
the disc surface and the central aperture are circular;
the plurality of grooves is V-shaped; and
the plurality of slots is rectangular.

4. The dense loading system of claim 1, wherein the sparger system comprising:
a plurality of sparger holes;
each of the plurality of sparger holes being aligned to a corresponding groove, wherein the corresponding groove is from the plurality of grooves.

5. The dense loading system of claim 1, the motor system comprising:
at least one motor compartment;
at least one pneumatic motor; and
the at least one pneumatic motor being mounted within the at least one motor compartment.

6. The dense loading system of claim 5, wherein the at least one motor compartment and the at least one motor are mounted within the cavity of the receptacle.

7. The dense loading system of claim 5, wherein the at least one motor compartment and the at least one motor are mounted outside the receptacle.

8. The dense loading system of claim 1, comprising a manual catalyst distribution mode and an automatic catalyst distribution mode.

9. The dense loading system of claim 8, wherein the automatic catalyst distribution mode comprising:
a microcontroller;
at least one monitoring unit;
a compressor;
a plurality of valves;
a first valve from the plurality of valves being connected to the sparger system;
a second valve from the plurality of valves being connected to the motor system;
the microcontroller being electronically coupled to the compressor and the at least one monitoring unit;
the at least one monitoring unit being mounted within the catalyst reactor; and
the compressor being operably coupled to the plurality of valves, wherein dimensions of each of the plurality of valves are controlled by the microcontroller through the compressor, based on readings from the at least one monitoring unit.

10. The dense loading system of claim 1, comprising:
at least one inspection gate;
the at least one inspection gate being laterally positioned along a longitudinal segment of the receptacle; and
the at least one inspection gate allowing opening and closing of the receptacle along the longitudinal segment of the receptacle.

11. The dense loading system of claim 1, wherein the sparger system comprises at least one of a uniform sparger and a snail sparger.

12. The dense loading system of claim 1, wherein the catalyst load coming through catalyst distribution disc is loaded in radial waves.

13. The dense loading system of claim 1, comprising:
a gyroscopic system; and
the gyroscopic system being operably coupled to the catalyst distribution disc, wherein the gyroscopic system ensures horizontal orientation of the catalyst distribution disc.

14. The dense loading system of claim 1, comprising:
a plurality of sliding legs;
a plurality of adjustment knobs;
the plurality of sliding legs being mounted perimetrically around the receptacle;

the plurality of adjustment knobs being integrated within the plurality of sliding legs;

the plurality of sliding legs and plurality of adjustment knobs being operably coupled to the dense loading machine, wherein operating the plurality of sliding legs and the plurality of adjustment knobs governs horizontal motion of the dense loading machine along a transverse cross section of the catalyst reactor.

15. A dense loading system comprising:

a dense loading machine;

a catalyst load;

a catalyst reactor;

the dense loading machine comprising a receptacle, a cavity, a catalyst receiving port, a motor system, a gas piping system, a sparger system, and a catalyst distribution disc;

the catalyst distribution disc comprising a disc surface, a plurality of grooves and a plurality of slots;

the sparger system comprising a plurality of sparger holes;

the dense loading machine being mounted within a loading aperture of the catalyst reactor;

the cavity traversing into the receptacle;

the cavity extending from a first end of the receptacle towards a second end of the receptacle wherein the first end is positioned opposite to the second end across the receptacle;

the catalyst receiving port delineating the first end of the receptacle;

the catalyst distribution disc being mounted adjacent to the second end of the receptacle;

the sparger system being mounted within the cavity adjacent to the second end of the receptacle;

the gas piping system being in fluid communication with the sparger system and the motor system;

the sparger system being operably aligned to the catalyst distribution disc, wherein gas from the gas piping system is distributed along the catalyst distribution disc through the plurality of sparger holes;

the catalyst distribution disc being operably coupled with the motor system, wherein operating the motor system governs rotational motion of the catalyst distribution disc;

the plurality of grooves being evenly distributed radially around the disc surface;

the plurality of slots traversing through disc surface;

each of the plurality of sparger holes being aligned to a corresponding groove, wherein the corresponding groove is from the plurality of grooves; and the dense loading machine being operably coupled to the catalyst reactor, wherein the catalyst load coming through the catalyst receiving port into the receptacle is evenly distributed within the catalyst reactor by the catalyst distribution disc.

16. The dense loading system of claim 15, the motor system comprising:

at least one motor compartment;

at least one pneumatic motor; and the at least one pneumatic motor being mounted within the at least one motor compartment.

17. The dense loading system of claim 16, wherein the at least one motor compartment and the at least one motor are mounted outside the receptacle.

18. The dense loading system of claim 15, wherein an automatic catalyst distribution mode comprising:

a microcontroller;

at least one monitoring unit;

a compressor;

a plurality of valves;

a first valve from the plurality of valves being connected to the sparger system;

a second valve from the plurality of valves being connected to the motor system;

the microcontroller being electronically coupled to the compressor and the at least one monitoring unit;

the at least one monitoring unit being mounted within the catalyst reactor; and the compressor being operably coupled to the plurality of valves, wherein dimensions of each of the plurality of valves are controlled by the microcontroller through the compressor, based on readings from the at least one monitoring unit.

19. The dense loading system of claim 15, comprising:

at least one inspection gate;

the at least one inspection gate being laterally positioned along a height of the receptacle; and the at least one inspection gate allowing opening and closing of the receptacle along a longitudinal segment of the receptacle.

20. The dense loading system of claim 15, comprising:

a gyroscopic system;

the gyroscopic system being operably coupled to the catalyst distribution disc, wherein the gyroscopic system ensures horizontal orientation of the catalyst distribution disc.

* * * * *